(12) United States Patent
He et al.

(10) Patent No.: US 12,149,777 B2
(45) Date of Patent: Nov. 19, 2024

(54) METHOD, APPARATUS, ELECTRONIC DEVICE, AND STORAGE MEDIUM FOR PRESENTATION OF A MATCHING SCHEME

(71) Applicant: Beijing Youzhuju Network Technology Co., Ltd., Beijing (CN)

(72) Inventors: Lei He, Beijing (CN); Renyi Chen, Beijing (CN); Sixun Ma, Beijing (CN); Haochen Xu, Beijing (CN); Yujing Wang, Beijing (CN); Haoze Wu, Beijing (CN); Ganyan Huang, Beijing (CN); Zhichao Yan, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/509,085

(22) Filed: Nov. 14, 2023

(65) Prior Publication Data

US 2024/0080516 A1    Mar. 7, 2024

Related U.S. Application Data

(63) Continuation of application No. PCT/CN2023/115351, filed on Aug. 28, 2023.

(30) Foreign Application Priority Data

Aug. 29, 2022  (CN) .......................... 202211040467.X

(51) Int. Cl.
*H04N 21/431*  (2011.01)
*H04N 21/2187* (2011.01)

(52) U.S. Cl.
CPC ..... *H04N 21/4316* (2013.01); *H04N 21/2187* (2013.01)

(58) Field of Classification Search
CPC .......... H04N 21/4316; H04N 21/2187; G06Q 30/0277
(Continued)

(56) References Cited

U.S. PATENT DOCUMENTS

2020/0111135 A1* 4/2020 Box .................. G06Q 30/0201
2021/0133160 A1* 5/2021 Craft .................... G06F 16/148
(Continued)

FOREIGN PATENT DOCUMENTS

CN         106447365 A       2/2017
CN         107305674 A      10/2017
(Continued)

OTHER PUBLICATIONS

International Search Report in PCT/CN2023/115351, mailed Nov. 16, 2023, 3 pages.

*Primary Examiner* — Dominic D Saltarelli
(74) *Attorney, Agent, or Firm* — Astute IP Law Group

(57) ABSTRACT

The present disclosure relates to a method, apparatus, electronic device and storage medium for presentation of a matching scheme. The method comprises: acquiring a set of matching schemes; transmitting, to a first terminal, attribute information of matching schemes in the set of matching schemes, so that the first terminal displays attribute information of matching schemes comprised in the set of matching schemes; in response to a selection request for one of matching schemes transmitted by the first terminal, determining the selected matching scheme as a matching scheme to be explained; in response to a presentation request for the matching scheme to be explained that is transmitted by a second terminal, transmitting attribute information of the matching scheme to be explained to the second terminal, so that the second terminal presents a target information (Continued)

streaming page comprising at least a part of attribute information of the matching scheme to be explained.

18 Claims, 16 Drawing Sheets

(58) Field of Classification Search
USPC .......................................... 725/32; 705/14.73
See application file for complete search history.

(56) References Cited

U.S. PATENT DOCUMENTS

2022/0021921 A1\* 1/2022 Osman ..................... G06T 7/50
2022/0060534 A1\* 2/2022 Bodin ................. G06Q 30/0253

FOREIGN PATENT DOCUMENTS

| CN | 110309412 A | 10/2019 |
| CN | 112016986 A | 12/2020 |

\* cited by examiner

| 1、SELECT A MATCHING COMMODITY | 2、SET MATCHING PRESENTATION | 3、SUCCESSFULLY CREATED |

UPLOAD THE MAIN MATCHING IMAGE
PLEASE TRY TO INCLUDE THE FRONT AND BACK OF THE WHOLE BODY AND LOCAL CLOSE-UPS, WHICH WILL HELP GENERATE MORE EXPOSURE, SEE THE "PLATFORM RULES" FOR DETAILS, THE MATCHING WILL TAKE EFFECT WHEN THE IMAGE IS APPROVED, AND IF THE IMAGE IS MODIFIED AFTER THE REVIEW IS PASSED, IT WILL BE RESUBMITTED FOR REVIEW

PREVIEW AREA FOR MAIN MATCHING IMAGE

AREA FOR UPLOADING MAIN MATCHING IMAGE

COMMODITY ANCHOR
PLEASE TRY TO INCLUDE A TOP, A BOTTOM, SHOES AND ACCESSORIES IN THE MATCHING TO HELP ENHANCE CONSUMER'S FAVORABILITY

ADD MATCHING COMMODITIES

NEXT   CANCEL

FIG. 4

| 1、SELECT A MATCHING COMMODITY | 2、SET MATCHING PRESENTATION | 3、SUCCESSFULLY CREATED |

UPLOAD THE MAIN MATCHING IMAGE
PLEASE TRY TO INCLUDE THE FRONT AND BACK OF THE WHOLE BODY AND LOCAL CLOSE-UPS, WHICH WILL HELP GENERATE MORE EXPOSURE, SEE THE "PLATFORM RULES" FOR DETAILS, THE MATCHING WILL TAKE EFFECT WHEN THE IMAGE IS APPROVED, AND IF THE IMAGE IS MODIFIED AFTER THE REVIEW IS PASSED, IT WILL BE RESUBMITTED FOR REVIEW

MAIN MATCHING IMAGE

AREA FOR UPLOADING MAIN MATCHING IMAGE

COMMODITY ANCHOR
PLEASE TRY TO INCLUDE A TOP, A BOTTOM, SHOES AND ACCESSORIES IN THE MATCHING TO HELP ENHANCE CONSUMER'S FAVORABILITY

| KNIT COAT | LINK TO THE KNIT COAT |
| HOLLOW BAG | LINK TO THE HOLLOW BAG |
| HAREM PANTS | LINK TO HAREM PANTS |

ADD MATCHING COMMODITY

NEXT   CANCEL

FIG. 5

| 1. SELECT A MATCHING COMMODITY | 2. SET MATCHING PRESENTATION | 3. SUCCESSFULLY CREATED |

BASIC INFORMATION OF THE MATCHING

MATCHING NAME [                    ]

PRESENTATION POSITION OF THE MATCHING     ○ MAIN IMAGE OF COMMODITY     ○ STORE HOMEPAGE

MATCHING RECOMMENDATION [                    ]

[ COMPLETE THE SETUP ]  [ PREVIOUS STEP ]  [ CANCEL ]

FIG. 6

| 1. SELECT A MATCHING COMMODITY | 2. SET MATCHING PRESENTATION | 3. SUCCESSFULLY CREATED |

MATCHING IS CREATED SUCCESSFULLY

FIG. 7

METHOD, APPARATUS, ELECTRONIC DEVICE, AND STORAGE MEDIUM FOR PRESENTATION OF A MATCHING SCHEME

CROSS-REFERENCE TO RELATED APPLICATIONS

This application is a Continuation Application of International Patent Application No. PCT/CN2023/115351, filed Aug. 28, 2023, which claims priority to Chinese Application No. 202211040467.X filed Aug. 29, 2022, the disclosures of which are incorporated herein by reference in their entities.

FIELD

The present disclosure relates to the field of information processing technology, in particular to a method, apparatus, electronic device and storage medium for presentation of a matching scheme.

BACKGROUND

With the continuous development of video livestreaming technology, people's demand for functions related to a livestream room is becoming increasingly diverse, especially in the parts closely related to people's experience of watching the livestream.

In a livestreaming scenario, it often happens that when a live streamer is explaining a certain piece of clothing he/she is wearing, the users ask in the comment area about link numbers of other clothes the live streamer is wearing. If such a situation occurs many times, it will affect the efficiency of the live streamer's explanation of the clothes, and also the viewing experience of other users.

SUMMARY

In order to solve the above technical problems or at least partially solve the above technical problems, the present disclosure provides a method, apparatus, electronic device and storage medium of presentation of a matching scheme.

In a first aspect, the present disclosure provides a method for presentation of a matching scheme, comprising:
  acquiring a set of matching schemes; the set of matching schemes comprising at least one matching scheme, the matching scheme comprising at least two objects, the at least two objects having a matching relation;
  transmitting, to a first terminal, attribute information of the matching schemes in the set of matching schemes, so that the first terminal displays the attribute information of the matching schemes comprised in the set of matching schemes;
  in response to a selection request for one of the matching schemes transmitted by the first terminal, determining the selected matching scheme as a matching scheme to be explained;
  in response to a presentation request for the matching scheme to be explained that is transmitted by a second terminal, transmitting the attribute information of the matching scheme to be explained to the second terminal, so that the second terminal presents a target information streaming page comprising at least a part of the attribute information of the matching scheme to be explained.

In a second aspect, the present disclosure also provides an apparatus for presentation of a matching scheme, comprising:
  an acquisition module for acquiring a set of matching schemes; the set of matching schemes comprising at least one matching scheme, the matching scheme comprising at least two objects, the at least two objects having a matching relation;
  a transmitting module for transmitting, to a first terminal, attribute information of the matching schemes in the set of matching schemes, so that the first terminal displays the attribute information of the matching schemes comprised in the set of matching schemes;
  a determination module for in response to a selection request for one of the matching schemes transmitted by the first terminal, determining the selected matching scheme as a matching scheme to be explained;
  a presentation module for in response to a presentation request for the matching scheme to be explained that is transmitted by a second terminal, transmitting the attribute information of the matching scheme to be explained to the second terminal, so that the second terminal presents a target information streaming page comprising at least a part of the attribute information of the matching scheme to be explained.

In a third aspect, the present disclosure also provides an electronic device. The electronic device comprises:
  one or more processors;
  a storage apparatus for storing one or more programs;
  the one or more programs, when executed by the one or more processors, cause the one or more processors to carry out the method for presentation of a matching scheme as described above.

In a fourth aspect, the present disclosure also provides a computer-readable storage medium having a computer program stored thereon, when executed by a processor, carries out the method for presentation of a matching scheme as described above.

BRIEF DESCRIPTION OF THE DRAWINGS

The accompanying drawings herein, which are incorporated into and constitute a part of the specification, illustrate the embodiments consistent with the present disclosure, and are used in connection with the specification to explain the principles of the present disclosure.

In order to more clearly illustrate the technical solutions in the embodiments of the present disclosure or in the prior art, the accompanying drawings required in the description of the embodiments or the prior art will be briefly introduced below. It is apparent to those of ordinary skill in the art that other drawings can be obtained from these accompanying drawings without any creative effort.

FIGS. 4-5 are schematic diagrams of display interfaces of two matching creation terminals provided by the embodiments of the present disclosure;

FIG. 6 is a schematic diagram of a display interface of another matching creation terminal provided by the embodiments of the present disclosure;

FIG. 7 is a schematic diagram of a display interface of another matching creation terminal provided by the embodiments of the present disclosure;

DETAILED DESCRIPTION

In order to understand the above objectives, features, and advantages of the present disclosure more clearly, the following will further describe the solution of the present disclosure. It should be noted that, the embodiments of the present disclosure and the features in the embodiments may be combined with each other without any conflict.

Many specific details are set forth in the following description to facilitate a full understanding of the present disclosure, but the present disclosure can also be implemented in other ways different from those described herein; obviously, the embodiments in the description are only a part of the embodiments of the present disclosure, rather than all of them.

As mentioned in the background section, in the livestreaming scenario, it often happens that when a live streamer is explaining a certain piece of clothing he/she is wearing, the users that are watching the livestream ask in the comment area about link numbers of other clothes the live streamer is wearing. If such a situation occurs many times, it will affect the efficiency of the live streamer's explanation of the clothes, and also affect the viewing experience of other users that are watching the livestream.

The reason for the above problem is that in the field of e-commerce, there are few merchants or influencers who recommend commodities with matching as an object. However, the users who watch the livestream (in the present application, the users who watch the livestream include, but are not limited to, potential buyers) due to a lack of matching knowledge, when browsing or purchasing a certain commodity, are relatively blind in their choice of commodities and thus the effect of their own matching is not satisfactory. As a result, the livestream viewers can only frequently inquire with the live streamer, interrupt the live streamer's explanation of clothes, resulting in low efficiency in the live streamer's explanation of clothes.

Figure 1:
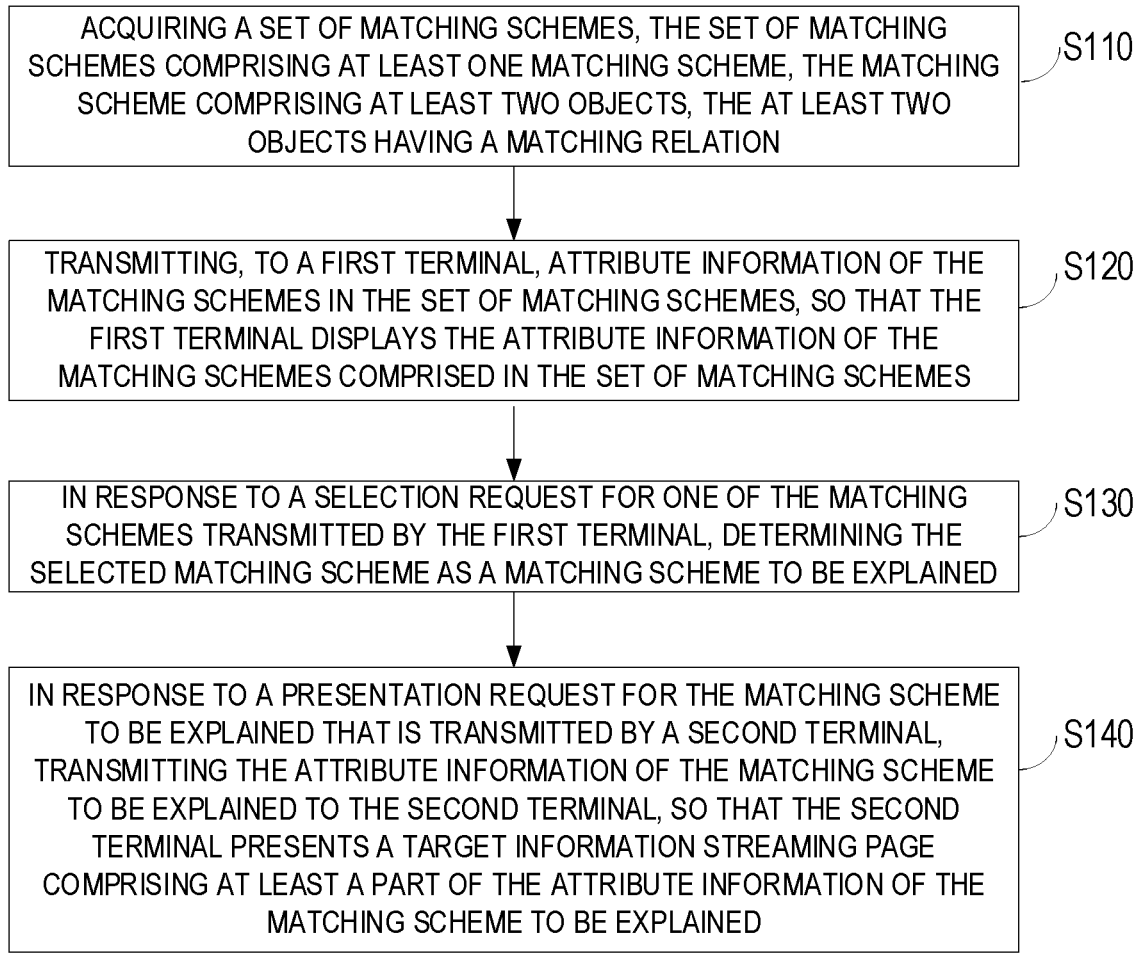
FIG. 1 is a flow chart of a method for presentation of a matching scheme provided by the embodiments of the present disclosure.

FIG. 1 is a flow chart of a method for presentation of a matching scheme provided by the embodiments of the present disclosure. The embodiment may be applicable to a situation where the matching scheme is put on the shelf and displayed on the information streaming page on the server, so that the matching scheme as a whole can be recommended to the livestream viewers. The method may be implemented by an apparatus for presentation of the matching schemes, which may be implemented in software and/or hardware. The apparatus may be configured in an electronic device, for example, a server.

As shown in FIG. 1, the method may specifically comprise:

S110, acquiring a set of matching schemes; the set of matching schemes comprising at least one matching scheme, the matching scheme comprising at least two objects, the at least two objects having a matching relation.

The object refers to a commodity. Exemplarily, the object is specifically an item, a service, or etc. In a livestream room, a live streamer explains the objects through live streaming for the purpose of sharing the objects with the audience.

The object comprises multiple attributes. The attributes of the object are the characteristics of its own construction and composition. If the object is an item, its attributes comprise the object's name, style, size, material, function, trademark, type, price, color, packaging, etc. If the object is a service, its attributes comprise the content, precautions, etc. encompassed in the object. The attributes of the object reflect the attractiveness of the object to customers. The attributes of the object are the main stimuli that can influence users' cognitions, emotions, and behaviors. Attribute information of the object is the information that describes the attributes of the object. The attribute information of the object allows the users to quickly understand, select, and purchase the object.

The matching relation is an association relation that may be created manually, or automatically by devices, such as, servers. In a case where the matching relation is automatically created by the device, optionally, the device utilizes a matching model to automatically create matching relations among different objects based on the attributes of multiple objects.

The matching scheme is a set of information comprising at least two objects. In the same matching scheme, all the objects have a matching relation. By way of example, a certain matching scheme comprises a coat, a top and trousers. By combining the coat, the top, and trousers, a set of clothing may be obtained that is coordinated in style and color, and achieves an overall decent and elegant effect. Therefore, the coat, the top and trousers may form an outfit matching scheme.

There are multiple implementations of this step, and the present application does not limit in this regard. For example, the implementations of this step comprises: determining a set of matching schemes from a matching database.

If a matching scheme is considered as an element, a set of matching schemes and the matching database are both collections of multiple elements (i.e., matching schemes), and both belong to sets. A set of matching schemes is a subset of the matching database. The matching database is used to manage all matching schemes. The set of matching schemes is a collection of matching schemes in the matching database that satisfies the filtering conditions.

There are many specific implementations of "determining a set of matching schemes from a matching database", and the present disclosure does not limit in this regard. For example, the specific implementations of "determining a set of matching schemes from a matching database" comprises: acquiring authority information of a live streamer; determining, from the matching database, a set of matching schemes based on the authority information of the live streamer. The authority information of the live streamer is used to describe which matching schemes the live streamer can represent, explain, share or sell through live streaming. Determining, from the matching database, a set of matching schemes based on the authority information of the live streamer refers to extracting the matching schemes for which the live streamer has the authority to delegate, explain, share or sell from the matching database based on the authority information of the live streamer, and gathering the extracted matching schemes together to obtain a set of matching schemes. In this case, a preset filtering condition is whether the matching scheme is within the authority of the live streamer.

In case of a state of the matching scheme comprising a valid state and an invalid state; the specific implementations of "determining a set of matching schemes from a matching database" may further comprise: collecting matching schemes in the valid state in the matching database to obtain a set of matching schemes. The state of the matching scheme being the valid state refers to a state of recommending and allowing to share the matching scheme to the users. The state of the matching scheme being the invalid state refers to the state of not recommending or allowing to share the matching scheme to the users. In this way, all the matching schemes in the set of matching schemes are in the valid state. In this case, the preset filtering condition is that the state of the matching schemes is the valid state.

Optionally, the live streamer may also be allowed to configure the filtering condition in advance to obtain the preset filtering condition.

Prior to this step (S110), optionally, the method further comprises: acquiring identification information of at least two objects; constructing a matching scheme based on the identification information of the at least two objects; adding the constructed matching scheme to the matching database.

The identification information of an object refers to the information that can uniquely distinguish the object from other objects. Exemplarily, the identification information of the object comprises the number of the object, a link address of a web page for presenting the attribute information of the object, or a name of the object, and so on.

Constructing a matching scheme based on the identification information of the at least two objects refers to establishing a matching relation between the at least two objects based on the identification information of the at least two objects, thereby achieving the purpose of forming a matching scheme.

The purpose of "adding the constructed matching scheme to the matching database" is to update the matching database so that the matching database always stores the latest matching schemes.

In another embodiment, after constructing the matching scheme based on the identification information of the at least two objects, the solution further comprises: in response to a configuration instruction of the matching scheme, configuring promotion information of the matching scheme.

The promotion information of the matching scheme refers to additional information for improving the popularity of the matching scheme among the users. Optionally, the promotion information comprises descriptive information of a promotion activity. Specifically, the promotion information comprises the descriptive information of a marketing activity that the matching scheme participates in.

"Configuring promotion information of the matching scheme" is essentially to configure the marketing activity that the matching scheme participates in.

It should be noted that, in practice, for the same matching scheme, the main body that triggers the server to construct a matching scheme and the main body that triggers the configuration of the promotion information may or may not be the same. By way of example, the main body that triggers the construction of the matching scheme is an influencer, a merchant or a livestreaming platform; the subject that triggers the server to configure the promotion information is the merchant or the livestreaming platform. The influencers refer to people with matching skills, including but not limited to live streamers.

It should also be noted that, in practice, the commodities comprised in the matching schemes may come from the same merchant or from different merchants.

S120, transmitting, to a first terminal, attribute information of the matching schemes in the set of matching schemes, so that the first terminal displays the attribute information of the matching schemes comprised in the set of matching schemes.

The attribute information of the matching scheme comprises one or more of the following: attribute information of objects constituting the matching scheme, the attribute information of the matching scheme as a whole, and the promotion information of the matching scheme.

The attribute of the matching scheme as a whole refers to the characteristics of the matching scheme since its creation. By way of example, a certain matching scheme comprises a coat, a top and trousers. By combining the coat, the top, and trousers, a professional outfit that is in shades of gray and in line with the fashion trend of the year X may be obtained. "Shades of gray", "in line with the fashion trend of the year X" and "professional outfit" are the attributes of the matching scheme as a whole. The attribute information of the matching scheme as a whole is the information for describing an overall attribute of the matching scheme.

It should be noted that both of the attribute information of the matching scheme as a whole and the promotion information can improve the popularity of the matching scheme among the users. However, the attribute information of the matching scheme as a whole is available since the matching scheme is created, which does not require additional configuration. The promotion information of the matching scheme is additional, and requires a dedicated configuration. In some matching schemes, there may be only the attribute information of the matching scheme as a whole and no promotion information. In other matching schemes, there are both the attribute information of the matching scheme as a whole and the promotion information.

In one embodiment, the first terminal is a live streamer side terminal.

The purpose of this step is that the live streamer can understand the details of each of the set of matching schemes through the first terminal, and then decide which matching schemes to explain during the livestream. Explaining the matching scheme comprises explaining the whole matching scheme or one or more objects in the matching scheme.

It should be noted that, in one embodiment, S120 may be performed directly after S110 is performed. Alternatively, after S110 is performed, acquiring an acquisition request for the matching schemes transmitted by the first terminal; transmitting, to the first terminal, the attribute information of the matching schemes in the set of matching schemes. For example, by operating the first terminal (such as clicking a control for viewing the matching schemes) by the live streamer team, the first terminal generates the acquisition request for the matching schemes and transmits the acquisition request for the matching schemes to the server. The server responds to the acquisition request for the matching schemes; transmits the attribute information of matching schemes in the set of matching schemes to the first terminal.

S130, in response to a selection request for one of the matching schemes transmitted by the first terminal, determining the selected matching scheme as a matching scheme to be explained.

The matching scheme to be explained refers to the matching scheme that the live streamer hopes to share with the audience through the livestream.

The selection operation of the matching scheme is the operation in which the live streamer team conveys to the live streamer side terminal which matching scheme it wants to explain during the livestream. Specifically, the selection operation may be a click operation or sliding operation by the live streamer team on one or more matching schemes displayed on the live streamer side terminal.

Optionally, after the first terminal displays the attribute information of each of the matching schemes in the set of matching schemes, the live streamer team (comprising the live streamer or other staff assisting the live streamer in the livestream) perform a select operation on one of the set of matching schemes through the first terminal. After detecting the selection operation, the first terminal generates a selection request for the matching scheme and transmits the selection request for the matching scheme to the server, the server determines the selected matching scheme as the matching scheme to be explained based on the selection request for the matching scheme.

S140, in response to a presentation request for the matching scheme to be explained that is transmitted by a second terminal, transmitting the attribute information of the matching scheme to be explained to the second terminal, so that the second terminal presents a target information streaming page comprising at least a part of the attribute information of the matching scheme to be explained.

Optionally, the second terminal is a livestream viewer side terminal.

The information streaming page may be the page in an application for presenting information streaming to the users. In some embodiments, the information streaming page may be a preview streaming page, a detailed information streaming page or the like for different types of information, such as, videos, text, images, etc.

The preview streaming page refers to the page for driving traffic. In the livestreaming scenario, the information streaming page may be a video page for driving traffic to the livestream room, such as, a video page for a short form video (the video content of the short form video may be different from that of the livestream room), or a preview streaming page for the livestream room. The preview streaming page of the livestream room is used for presenting a preview video of the livestream. The livestream preview video may be a video clip for representing the livestreaming content in the livestream room. The livestreaming content can be previewed through the video clip, which may be generated based on the livestreaming content of the livestream room. For example, the livestreaming content may be used as the livestream preview video or the livestream preview video may be generated by truncating the livestreaming content.

In the livestreaming scenario, the detailed information streaming page comprises a presentation page of the livestream room, which refers to the page displayed upon entering the livestream room that is live streaming. Optionally, the presentation page of the livestream room comprises a public screen of the livestream room.

The target information streaming page refers to the page used by the live streamer team using the live streamer side terminal described in S120 to share objects during the livestream. The target information streaming page comprises the presentation page of the livestream room and the livestream preview streaming page.

"The second terminal presents a target information streaming page comprising at least a part of the attribute information of the matching scheme to be explained" refers to put the selected matching scheme on the shelf corresponding to the target information streaming page. In other words, the matching scheme as a whole is presented in the form of a commodity card on the target information streaming page. The commodity card may be considered as summary information of the matching scheme, which comprises at least a part of attribute information that constitutes the matching scheme. The commodity card also has a jump function. The user, by performing a selection operation on the commodity card (such as, click operation, or sliding operation) may access the details page of the matching scheme or the details page of an object that constitutes the matching scheme. The details page of the matching scheme is a page that presents the attribute information of the matching scheme as a whole. The detail page of an object that constitutes the matching scheme is the page that presents the attribute information of the object.

There are many occasions for the second terminal to generate the presentation request of the matching scheme to be explained, and thus the present application does not limit in this regard. For example, when the livestream viewer is watching the livestream by means of the livestream viewer side terminal, the livestream viewer side terminal presents the livestream presentation page. The livestream presentation page comprises an object list control. If it is detected that the livestream viewer triggers the object list control in the livestream presentation page, the livestream viewer side terminal generates the presentation request for the matching scheme to be explained. Subsequently, the livestream viewer side terminal transmits the presentation request for the matching scheme to be explained to the server, and in response to the presentation request for the matching scheme to be explained, the server transmits the attribute information of the matching scheme to be explained to the livestream viewer side terminal, so that the livestream viewer side terminal presents the livestream presentation page. The livestream presentation page comprises a list of objects, and the list of objects comprises the summary information of the matching scheme to be explained.

The above technical solution acquires a set of matching schemes, the set of matching schemes comprising at least one matching scheme, the matching scheme comprising at least two objects, and the at least two objects having a matching relation; transmits, to the first terminal, attribute information of the matching schemes in the set of matching schemes, so that the first terminal displays the attribute information of the matching schemes comprised in the set of matching schemes; in response to the selection request for a matching scheme sent by the first terminal, the selected matching schemes is determined as the matching scheme to be explained; in response to a selection request for one of the matching schemes transmitted by the first terminal, determines the selected matching scheme as a matching scheme to be explained; in response to a presentation request for the matching scheme to be explained that is transmitted by a second terminal, transmits the attribute information of the matching scheme to be explained to the second terminal, so that the second terminal presents a target information streaming page comprising at least a part of the attribute information of the matching scheme to be explained. It provides such a method that put the matching scheme as a whole on the shelf and present it on an information streaming page. A such, by viewing the information streaming page, the livestream viewers can directly identify which objects have a matching relation, which reduce the number of times the livestream viewers ask the live streamer in the comment area about which objects match better, and achieve the goal of improving the efficiency of the live streamer's explanation of the objects, while improving the viewing experience of other users who view the livestream.

On the basis of the above technical solution, optionally, all objects of any of the set of matching schemes are matching schemes for which an account of the first terminal has an agency authority. The first terminal refers to the live streamer side terminal, and the account of the first terminal refers to the account used by the live streamer team. "All objects of any of the set of matching schemes are matching schemes for which an account of the first terminal has an agency authority", means that the owner of the account of the first terminal has the authority to sell any of the objects that constitutes any of the set of matching schemes. Such a setting can ensure that no matter which of the set of matching schemes is selected by the live streamer team, it has the authority to sell any object in the matching scheme, so that the livestream views can purchase one or more objects in the matching scheme.

On the basis of the above technical solution, optionally, a state of the matching scheme comprises a valid state and an invalid state. The method further comprises: if one of the matching schemes satisfies a preset invalidation condition, setting the state of the matching scheme in the matching database from the valid state to the invalid state.

In practice, there are many invalidation conditions, and thus the present application does not limit in this regard. For example, the preset invalidation condition comprises that all objects in the matching scheme are in a preset state, and/or a lifetime of the matching scheme reaches a preset lifetime.

The preset state refers to the state that affects the recommendation of the commodities in the matching scheme, or the state that causes the users to be unable to purchase the commodities in the matching scheme. For example, the preset state comprises but is not limited to off the shelf, deletion, and blocked. "The state of a certain object is off the shelf" refers to the state that the sale of the object is suspended, and "the state of a certain object is deletion" refers to the state that the information of the object is deleted from the sales platform. "The state of a certain object is blocked" refers to the state that the object is prohibited from being sold.

In one embodiment, the server periodically acquires state information of each object. If at a certain time instant, the server acquires that the state information of a certain object (e.g., object A) changes, the server queries all matching schemes comprising object A in the matching database. If one or more matching schemes are queried to comprise object A, for each matching scheme, it judges whether all objects comprised in the matching scheme are in the preset state. If all objects comprised in a certain matching scheme are in the preset state, the state of the matching scheme in the matching database is set from the valid state to the invalid state.

In another embodiment, when constructing the matching scheme, the lifetime is set for the constructed matching scheme. For example, if the lifetime of a certain matching scheme is three days, the state of the matching scheme will be set from the valid state to the invalid state after three days counting from the time the matching schemes is successfully constructed.

If a matching scheme is configured with promotion information, "setting the state of the matching scheme in the matching database from the valid state to the invalid state" comprises: first setting the promotion information of the matching scheme from the valid state to the invalid state; then setting the state of the matching scheme from the valid state to the invalid state.

As described above, the promotion information comprises descriptive information of a promotion activity that the matching scheme participates in. As the promotion activity may be regarded as benefits that the merchant distributes to the users in order to improve the sales of the matching scheme, setting the promotion information of the matching scheme from the valid state to the invalid state means that the promotion activity described by the promotion information is invalid.

If the state of the matching scheme is first set to the invalid state, then the promotion information of the matching scheme is set to invalid, during the entire invalidation process, there will be a stage when the state of the matching scheme is in the invalid state and the promotion activity of the matching scheme is valid. At this stage, if the users find that the promotion activity exists, but there is no matching scheme to participate in the promotion activity, it will harm the reputation of the live streamer, the merchant and the platform in the users' mind. Alternatively, if the promotion information of the matching scheme is first set to invalid, then the state of the matching scheme is set to the invalid state, during the entire invalidation process, there will be a stage when the promotion activity of the matching scheme is invalid, but the matching scheme is valid. At this stage, users just can't participate in the promotion activity, but they can still purchase the objects in the matching scheme, which will not harm the reputation of the live streamer, the merchant and the platform in the users' mind.

Further, if a state of any of the matching schemes in the matching database changes from the valid state to the invalid state, the set of matching schemes is updated, so that all the matching schemes in the updated set of matching schemes are in the valid state. For example, if the state of any of the matching schemes in the matching database changes from the valid state to the invalid state, the following steps S110-S140 are re-executed. The purpose of this setting is to ensure that the matching scheme to be explained that is eventually presented on the target information streaming page is always a valid and saleable matching scheme.

On the basis of the above technical solutions, optionally, the method further comprises: storing the matching scheme to be explained in a set to be explained corresponding to the target information streaming page; if the set to be explained comprises a conflicting object corresponding to the matching scheme to be explained, deleting the conflicting object from the set to be explained; if the set to be explained comprises a conflicting matching scheme corresponding to the matching scheme to be explained, deleting the conflicting matching scheme from the set to be explained.

The conflicting object refers to the object that affects the livestream viewers' understanding of the matching scheme to be explained determined in S130, and causes trouble to the user.

In one embodiment, the conflicting object refers to the object to be explained whose presentation priority satisfies a preset presentation condition. The presentation priority is used as a basis for determining whether the object needs to be specially labelled during the presentation. The presentation priority of the object may be specified in advance, or may be determined according to one or more specific attribute information of the object (e.g., type, price, inventory, etc.), or may also be determined according to the interests and needs of the group to which the users belong, thus the present application does not limit in this regard. For example, the presentation priority of objects with a "mainly recommended" label is preset to be higher than the presentation priority of other objects.

Those skilled in the art can understand that in the livestreaming scenario, the commodity card of each object are presented through the commodity list. In order to highlight the "selected matching scheme", the "selected matching scheme" needs to be specially labelled, such as, displaying on top or highlighted. If there are one or more other objects (i.e., commodities) that have been specially labelled in the livestream room, it would make the "selected matching scheme" difficult for the users to notice quickly.

The conflicting matching scheme refers to the matching scheme that affects the livestream viewers' understanding of the matching scheme to be explained determined in S130, and causes trouble to the users.

In one embodiment, the conflicting matching scheme refers to the matching scheme comprising at least one object that is the same as at least one object comprised in the matching scheme to be explained. In other words, the conflicting matching scheme and the matching scheme to be explained comprise at least one same object.

For example, it assumes that a first matching scheme is stored in the set to be explained corresponding to the target information streaming page, and the matching scheme to be explained is a second matching scheme. The first matching scheme comprises object A and object B, and the second matching scheme comprises object A, object C and object D. Since both the first matching scheme and the second matching scheme comprise object A, when the live streamer explains object A, the livestream viewers cannot quickly understand whether the current explanation is for the first matching scheme or for the second matching scheme. In this case, to avoid confusing the users, the first matching scheme is deleted from the set to be explained. Since the time when the first matching schemes is stored in the set to be explained corresponding to the target information streaming page is earlier than the time when the second matching scheme is stored in the set to be explained corresponding to the target information streaming page, the deletion of the first matching scheme from the set to be explained can make the set to be explained corresponding to the target information streaming page only comprise the latest second matching scheme that comprises object A, which can satisfy the timeliness requirement.

The technical solution provided by the present disclosure will be described in detail blow with reference to specific examples. In these specific examples, the target information streaming page is the presentation page of the livestream room, the object is a commodity, the first terminal is the live streamer side terminal, and the second terminal is the livestream viewer side terminal.

Figure 2:
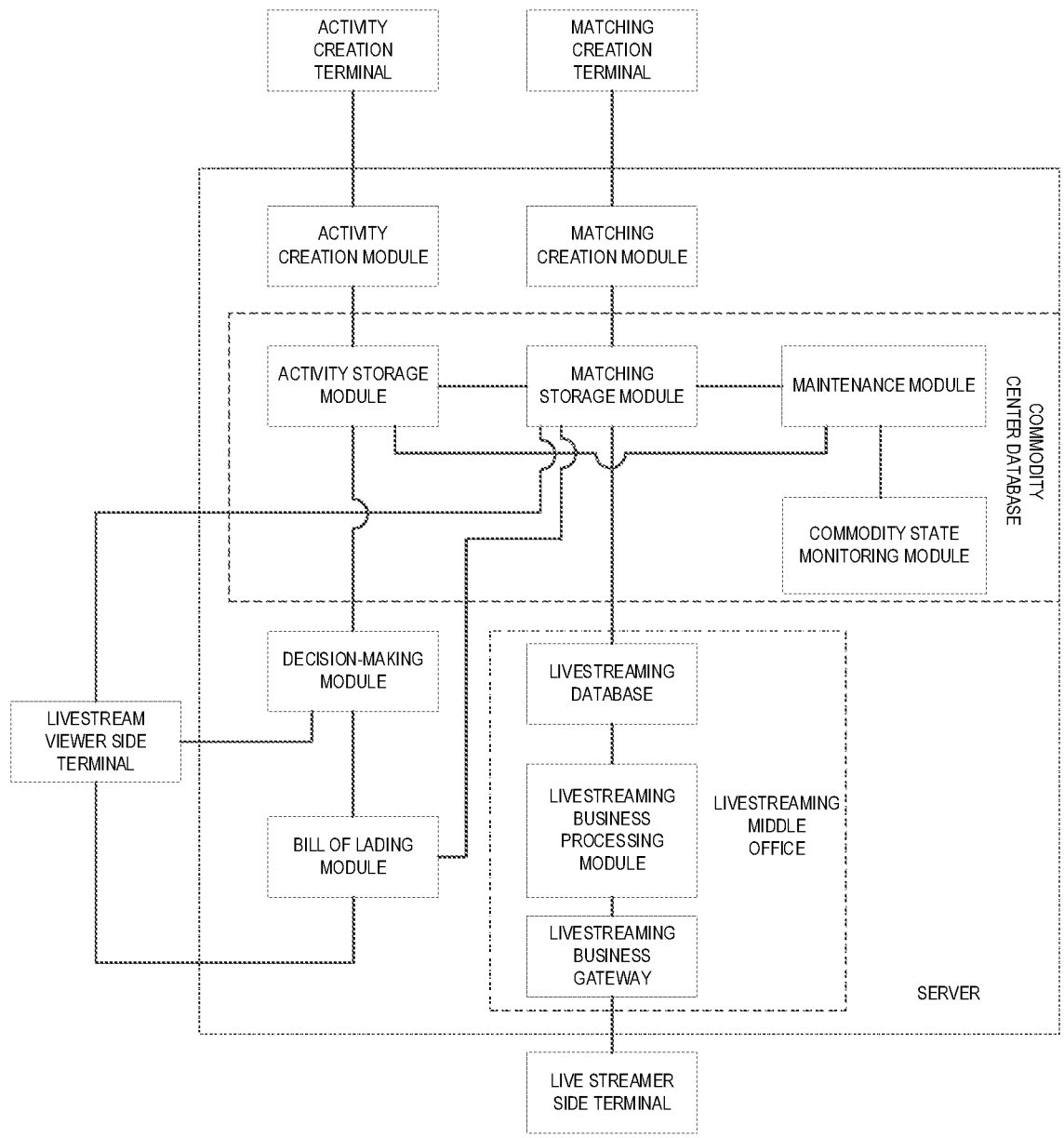
FIG. 2 is a structural block diagram of a system for implementing the method for presentation of a matching scheme provided by the embodiments of the present disclosure.

FIG. 2 is a structural block diagram of a system for implementing the method for presentation of a matching scheme provided by the embodiments of the present disclosure. As shown in FIG. 2, the system comprises an activity creation terminal, a matching creation terminal, a live streamer side terminal, a livestream viewer side terminal and a server. The server comprises an activity creation module, a matching creation module, a commodity center database, a decision-making module, a bill of lading module, and a livestreaming middle office.

The matching creation terminal interacts with the matching creation module in the server to create a matching scheme. The activity creation terminal interacts with the activity creation module in the server to configure a corresponding promotion activity for the created matching scheme.

The commodity center database comprises an activity storage module, a matching storage module, a maintenance module, and a commodity state monitoring module. The activity storage module is used to store the configured promotion activities. The matching storage module is used to store the created matching schemes. The commodity state monitoring module is used to monitor the state of the commodities. The commodities monitored by the commodity state monitoring module may or may not be the commodities comprised in the matching schemes. The maintenance module is used to maintain the state of matching schemes and the state of the promotion activities of the matching schemes.

The livestreaming middle office comprises a livestreaming database, a livestreaming business processing module, and a livestreaming business gateway. In one embodiment, a livestreaming database, a livestreaming business processing module, and a livestreaming business gateway constitute a livestreaming control module. The livestreaming control module corresponds to a livestream room, and is used to process transactions related to the corresponding livestream room. A livestreaming middle office comprises multiple livestreaming control modules.

The livestreaming business gateway is used to receive the selection request for a matching scheme transmitted by the live streamer side terminal (that is, the selection request for the matching scheme mentioned in S130 above). The livestreaming business processing module is used to determine the selected matching scheme as the matching scheme to be explained. The livestreaming database is used to store the matching scheme to be explained.

The decision-making module is used to calculate the price of the matching scheme after participating in various promotion activities.

The bill of lading module is used to assist users in purchasing commodities in the matching scheme.

The livestream viewer side terminal interacts with the commodity center database, the decision-making module and the bill of lading module to view and purchase commodities in the matching scheme;

In addition, the livestream viewer side terminal may also interact with the livestreaming middle office. Specifically, the livestream viewer side terminal transmits a presentation request for the matching scheme to be explained to the server. The server transmits the attribute information of the matching scheme to be explained to the livestream viewer side terminal. The livestream viewer side terminal renders the target information streaming page based on the attribute information of the matching scheme to be explained, thereby acquiring the target information streaming page comprising at least a part of the attribute information of the matching scheme to be explained, and present the target information streaming page.

Figure 3:
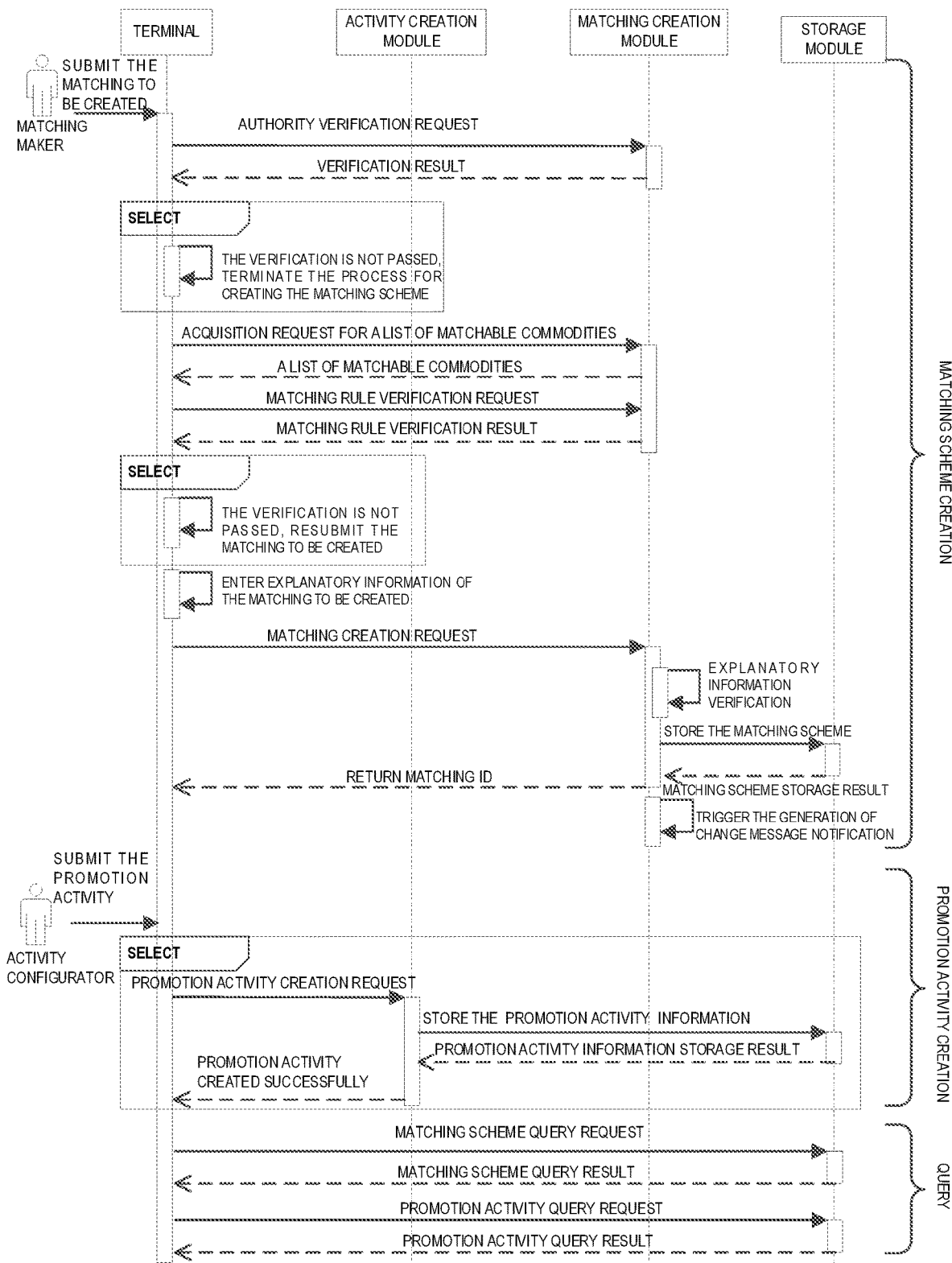
FIG. 3 is a flow chart of matching scheme creation, promotion activity configuration and querying thereof provided by the embodiments of the present disclosure.

FIG. 3 is a flow chart of matching scheme creation, promotion activity configuration and querying thereof provided by the embodiments of the present disclosure. It should be noted that in FIG. 3, the terminal comprises a matching creation terminal and an activity creation terminal. The storage module comprises a matching storage module and an activity storage module. In each step, what the terminal and the storage module refer to will be explained in detail in the subsequent introduction.

As shown in FIG. 3, the matching maker submits the matching schemes he/she wants to create by operating the matching creation terminal (for ease of explanation, which will be referred to as the matching to be created hereinafter). The matching to be created comprises identification information of at least two objects.

FIGS. 4-5 are schematic diagrams of display interfaces of two matching creation terminals provided by the embodiments of the present disclosure. For example, as shown in FIGS. 4-5, the display interfaces comprise four tabs, namely "Select matching commodities", "Set matching presentation", and "Successfully created". FIGS. 4 and 5 both shows the content of the tab "Select matching commodities". FIG. 4 is used to guide the matching maker to operate the matching creation terminal, input a main matching image of the matching to be created and the identification information of the objects comprised in the matching. The main matching image refers to an image that comprises all the objects comprised in the matching to be created. The display interface in FIG. 4 comprises a preview area for the main matching image, help information for uploading the main matching image and an upload area, help information for setting a commodity anchor and a setting area. FIG. 5 shows the display interface after the user inputs the main matching image of the matching to be created and the identification information of the objects comprised in the matching. Comparing FIG. 4 and FIG. 5, the matching maker operates on the upload area of the main matching image, which causes the main matching image to be displayed in the preview area of the main matching image. The matching maker also adds the names and links of the three objects that constitute the matching scheme. These three objects are coat, top, and trousers respectively. The user clicks on "Next" in FIG. 5 to submit the matching to be created.

Continuing to refer to FIG. 3, in response to the operation of submitting the matching to be created, the matching creation terminal transmits a permission check request to the matching creation module. The permission check request comprises the identification information of the objects comprised in the matching scheme submitted by the matching maker and the identification information of the matching maker. The permission check request mainly checks two aspects: first, whether the permission to create a matching scheme has been opened to the matching maker; second, whether the matching to be created is within the scope of the matching maker's creation permission. For example, if the permission to create a matching scheme is not opened to the matching maker, any matching to be created that is submitted by the matching maker will not pass the check. If the permission to create a matching scheme has been opened to the matching maker, however, the matching maker only has the permission to create matching schemes in the area of clothing accessories, the matching to be created with respect to medications that is submitted by the matching maker cannot pass the check.

After the matching creation module performs the permission check on the matching to be created, the check result is returned to the matching creation terminal. If the check does not pass, that is, no permission to create the matching, then the process of creating the matching scheme is terminated. If the check passes, the matching creation terminal transmits an acquisition request for a list of matchable commodities to the matching creation module.

In practice, multiple specification attribute information often corresponds to the same commodity. By selecting the specification attribute information, the minimum Stock Keeping Unit (SKU) may be defined. The SKU is the basic module for measuring inventory in and out. The minimum SKU is the smallest unit that defines a commodity and is determined by the combination of attributes of the commodity. For example, clothing has multiple specification attributes that users can choose from, such as, size, color, etc. Assuming that for a piece of clothing, there are respective three options for its size and color, there are nine (3×3=9) minimum SKUs for that piece of clothing. Each minimum SKU has a unique code. The function of the code is to distinguish and record information about different combinations of attributes. In other words, a commodity may comprise one or more specification attribute information. By combining one or more specification attribute information, one or more minimum SKUs can be obtained. As an example, the specification attribute information comprises at least one of the following: size, style, material, and color.

The list of matchable commodities refers to a list of minimum SKUs of the commodities to be comprised in the matching to be created. The acquisition request for the list of matchable commodities is used to acquire information about each minimum SKU of each commodity comprised in the matching to be created. The matching creation module returns the list of matching commodities to the matching creation terminal. Optionally, if the list of matchable commodities cannot be returned, a reason for not being able to return needs to be returned. If the returned list of matchable commodities is incomplete, a reason for the incomplete list of matchable commodities needs to be returned.

The matching creation terminal transmits a matching rule verification request to the matching creation module. The matching rule verification refers to verifying whether the matching to be created satisfies preset matching rules. The purpose of matching rule verification is to ensure that the eventually created matching scheme has a better matching effect. The preset matching rules specifically comprise a variety of contents, and thus the present application does not limit in this regard, as long as the contents can ensure a better matching effect to be obtained eventually. For example, the preset matching rules corresponding to clothing accessories comprise: in a case where a top has horizontal stripes, the trousers cannot have vertical stripes or plaids.

The matching creation module verifies whether the matching to be created satisfies the matching rules and forms a matching rule verification result, and returns the matching rule verification result to the matching creation terminal. If the matching rule verification result is not passed, the user is prompted to resubmit the matching to be created. If the matching rule verification result is passed, the matching creation terminal guides the matching maker to input explanatory information of the matching to be created. The explanatory information comprises the name of the matching, the presentation location, and the recommend.

FIG. 6 is a schematic diagram of a display interface of another matching creation terminal provided by the embodiments of the present disclosure. If the verification result is passed, the matching creation terminal displays the display interface shown in FIG. 6. FIG. 6 presents the content corresponding to the tab "Set the Matching Presentation". In the display interface shown in FIG. 6, the matching maker may edit the name, the presentation location, and the recommendation of the matching to be created. After filling out all the items in FIG. 6, the matching maker clicks "Setup Complete" and submits the explanatory information of the matching to be created.

Continuing to refer to FIG. 3, the matching creation terminal transmits a matching creation request to the matching creation module. After receiving the matching creation request, the matching creation module verifies the explanatory information of the matching to be created. The purpose of verifying the explanatory information is to determine whether the explanatory information comprises content that violates laws and regulations. The methods for verifying the explanatory information comprise but are not limited to determining whether the explanatory information (such as, the matching name, the recommendation, and the main matching image) comprises sensitive content.

If the explanatory information verification passes, the objects comprised in the matching to be created are stored in the matching storage module as a matching scheme. The matching storage module returns a storage result to the matching creation module. The matching creation module also returns the identification information of the created matching to the matching creation terminal, such as, the matching identity document (ID).

FIG. 7 is a schematic diagram of a display interface of another matching creation terminal provided by the embodiments of the present disclosure. FIG. 7 presents the content corresponding to the tab "Successfully Created". This display screen indicates that the matching to be created that was previously submitted by the matching maker has been successfully created.

Furthermore, the matching creation module also triggers the generation of a change message notification. Subsequently, the change message notification may be broadcast to the server for handling the transactions related to each merchant and/or livestream room, so that each merchant or livestream team can timely learn that there is a new matching scheme being created.

By operating the activity creation terminal, an activity configurator submits promotion activity (such as, a marketing activity) information that he/she wants to configure for the matching scheme.

Figures 8, 9:
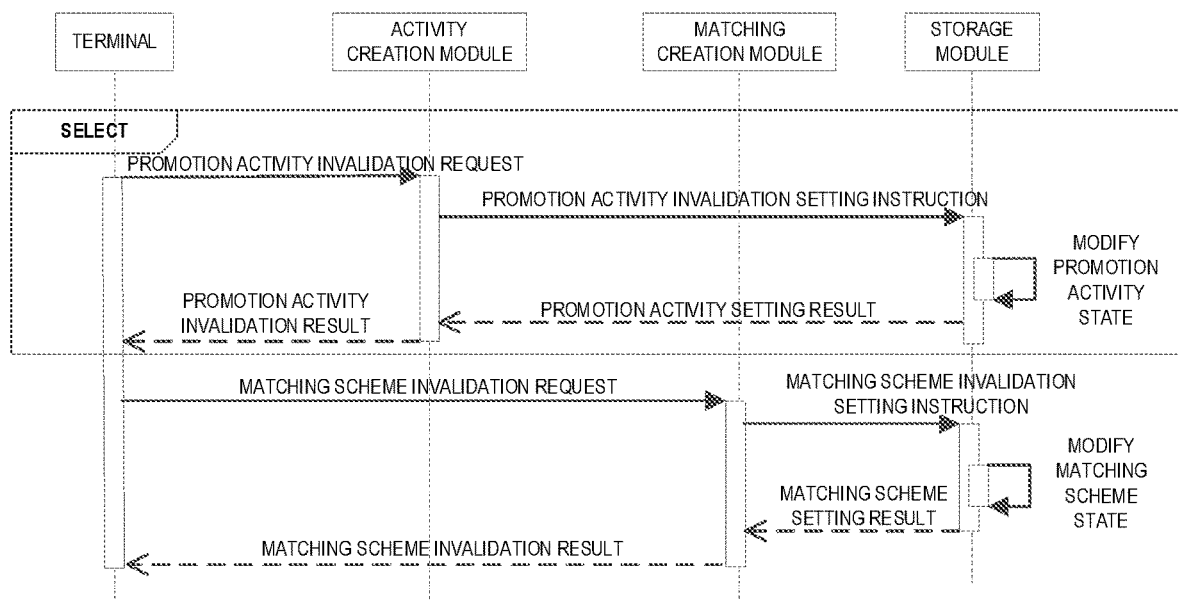
FIG. 8 is a schematic diagram of a display interface of an activity creation terminal provided by the embodiments of the present disclosure.
FIG. 9 is a flow chart of a method for setting a matching scheme to an invalid state provided by the embodiments of the present disclosure.

FIG. 8 is a schematic diagram of a display interface of an activity creation terminal provided by the embodiments of the present disclosure. FIG. 8 presents the display interface used to receive the promotion activity information configured by an activity creator. As shown in FIG. 8, the display interface allows the activity creator to select a configuration range and set a matching price for each commodity. Here, the configuration range comprises commodities and SKUs (minimum stock keeping unit). "The configuration range is commodities" refers to the configuration based on commodities in the matching scheme, that is, after the activity creator sets the matching price for a certain commodity, the matching prices of all the minimum stock keeping units corresponding to the commodity are the set price. If the configuration range is SKU, it refers to the configuration based on the minimum stock keeping unit of the object in the matching scheme, that is, after the activity creator sets the matching price for a certain minimum stock keeping unit of a commodity, the matching prices of other minimum stock keeping units corresponding to the commodity still need to be set.

The activity creation terminal generates a promotion activity creation request based on the promotion activity information provided by the activity configurator, and transmits the promotion activity creation request to the activity creation module. The activity creation module completes a creation operation of the promotion activity and stores the created promotion activity information in the activity storage module. After storing the promotion activity information, the activity storage module returns the storage result to the activity creation module. Based on the storage result, the activity creation module generates information about the successful creation of the promotion activity and returns the information about the successful creation of the promotion activity to the activity creation terminal.

It should be emphasized here that in practice, the matching maker may be an influencer (including but not limited to a live streamer), a merchant, or a sales platform. The activity configurator may be a merchant or a sales platform. And if both the matching maker and the activity configurator are the merchant or sales platform, the matchmaker and the activity configurator may or may not be the same.

In one embodiment, the influencer (including but not limited to the live streamer), the merchant or the platform is allowed to query the matching scheme or the promotion activity. Optionally, in practice, the commodities comprised in the matching scheme may be queried based on the matching scheme ID. The matching scheme created by a matching maker may be queried based on the matching maker ID. Based on a commodity ID, all the matching schemes comprising the commodity ID is queried; Based on the commodity ID and the matching ID, other commodities comprised in the matching are queried.

By way of example, in a case where the activity configurator is a merchant and the activity creation terminal is a merchant side terminal, continue to refer to FIG. 3, if there is a need to query a matching scheme, optionally, the activity configurator generates a request for querying the matching scheme by operating the activity creation terminal. The activity creation terminal transmits the request for querying the matching scheme to the matching storage module. The matching storage module returns a query result of the matching scheme to the activity creation terminal. If there is a need to query a promotion activity, optionally, the activity configurator generates a request for querying the promotion activity by operating the activity creation terminal. The activity creation terminal transmits the request for querying the promotion activity to the activity storage module. The activity storage module returns a query result of the promotion activity to the activity creation terminal.

In practice, the state of the matching scheme may be set to comprise the valid state and the invalid state. In practice, the influencer (including but not limited to the live streamer), the merchant or the platform may operate the terminal he/she holds as needed, so that the state of the matching scheme is set from the valid state to the invalid state. In another embodiment, the invalidation condition may be set for the matching scheme in advance. After the matching scheme and its promotion activity are successfully created, it is periodically determined whether the matching scheme satisfies the invalidation condition. If so, the state of the matching scheme is set from the valid state to the invalid state. Optionally, the preset invalidation condition comprises that all the objects in the matching scheme are in the preset state, and/or the lifetime of the matching scheme reaches the preset lifetime.

It should be noted that no matter what the reason is for setting the matching scheme from the valid state to the invalid state, when setting the matching scheme from the valid state to the invalid state, if the matching scheme has a corresponding promotion activity, the promotion activity is first set to be invalid, and then the matching scheme is set to be invalid. If the matching scheme does not have a corresponding promotion activity, the matching scheme is directly set to be invalid.

FIG. 9 is a flow chart of a method for setting a matching scheme to an invalid state provided by the embodiments of the present disclosure. In FIG. 9, the merchant or the platform operates the terminal he/she holds to set the matching scheme from the valid state to the invalid state.

Referring to FIG. 9, the specific steps for invalidation of the promotion activity comprise: the activity creation terminal transmits a promotion activity invalidation request to the activity creation module; the activity creation module generates a promotion activity invalidation setting instruction based on the promotion activity invalidation request, and transmits the promotion activity invalidation setting instruction to the activity storage module; the activity storage module modifies the state of the promotion activity stored internally based on the promotion activity invalidation setting instruction, and returns a promotion activity setting result to the activity creation module; the activity creation module generates a promotion activity invalidation result based on the promotion activity setting result, and returns the promotion activity invalidation result to the activity creation terminal.

The specific steps of invalidation of the matching scheme comprise: the activity creation terminal transmits a matching scheme invalidation request to the matching creation module; the matching creation module generates a matching scheme invalidation setting instruction based on the matching scheme invalidation request, and transmits the matching schemes invalidation setting instruction to the matching storage module; the matching storage module modifies the state of the matching scheme stored internally based on the matching scheme invalidation setting instruction, and returns the matching scheme setting result to the matching creation module; the matching creation module generates a matching scheme invalidation result based on the matching scheme setting result, and returns the matching scheme invalidation result to the activity creation terminal.

Figure 10:
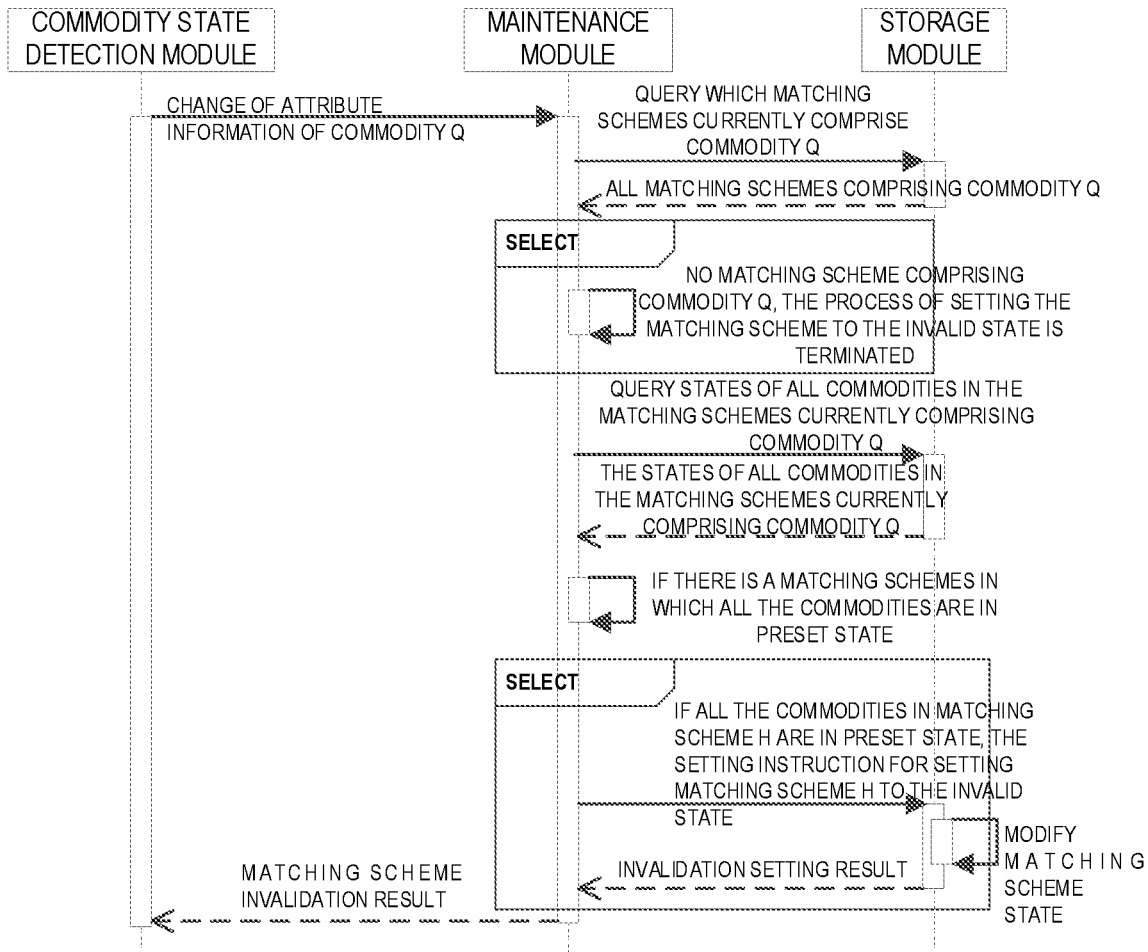
FIG. 10 is a flow chart of setting a matching scheme to the invalid state based on a preset invalidation condition provided by the embodiments of the disclosure.

FIG. 10 is a flow chart of setting the matching scheme to the invalid state based on a preset invalidation condition provided by the embodiments of the disclosure. In FIG. 10, after detecting a state change of a certain object, the server automatically sets the matching scheme from the valid state to the invalid state. The state change of the object refers to a change of one or more attribute information of the object. Specifically, after detecting the change of the attribute information of any commodity (e.g., commodity Q), the commodity state detection module synchronizes a message of attribute information change of commodity Q to the maintenance module. The maintenance module transmits a first query request to the storage module to query which matching schemes currently comprise commodity Q. The storage module returns all matching schemes that comprise commodity Q to the maintenance module. If all the matching schemes that comprise commodity Q returned by the storage module to the maintenance module are null, that is, there is no matching scheme comprising commodity Q, the process of setting the matching scheme from the valid state to the invalid state is terminated. If the matching schemes that comprise commodity Q returned by the storage module to the maintenance module are not null, that is, there is a matching scheme comprising commodity Q, the maintenance module transmits a second query request to the storage module to query the states of all the commodities in the matching scheme that currently comprises commodity Q. The storage module returns the states of all the commodities in the matching scheme that currently comprises commodity Q. The maintenance module determines whether there is a certain matching scheme in which all the commodities are in the preset state, wherein the preset state comprises one or more of the following: off the shelf, deletion and blocked. If there is a certain matching scheme (e.g., matching scheme H) in which all the commodities are in the preset state are in the preset state, and the matching scheme does not have a corresponding promotion activity, the maintenance module transmits a setting instruction for setting the matching scheme from the valid state to the invalid state to the matching storage module. The matching storage module modifies the state of the matching scheme stored internally based on the matching scheme invalidation setting instruction, and generates an invalidation setting result, and returns the invalidation setting result to the maintenance module. The maintenance module generates a matching scheme invalidation result based on the invalidation setting result, and returns the matching scheme invalidation result to the commodity state detection module.

Figure 11:
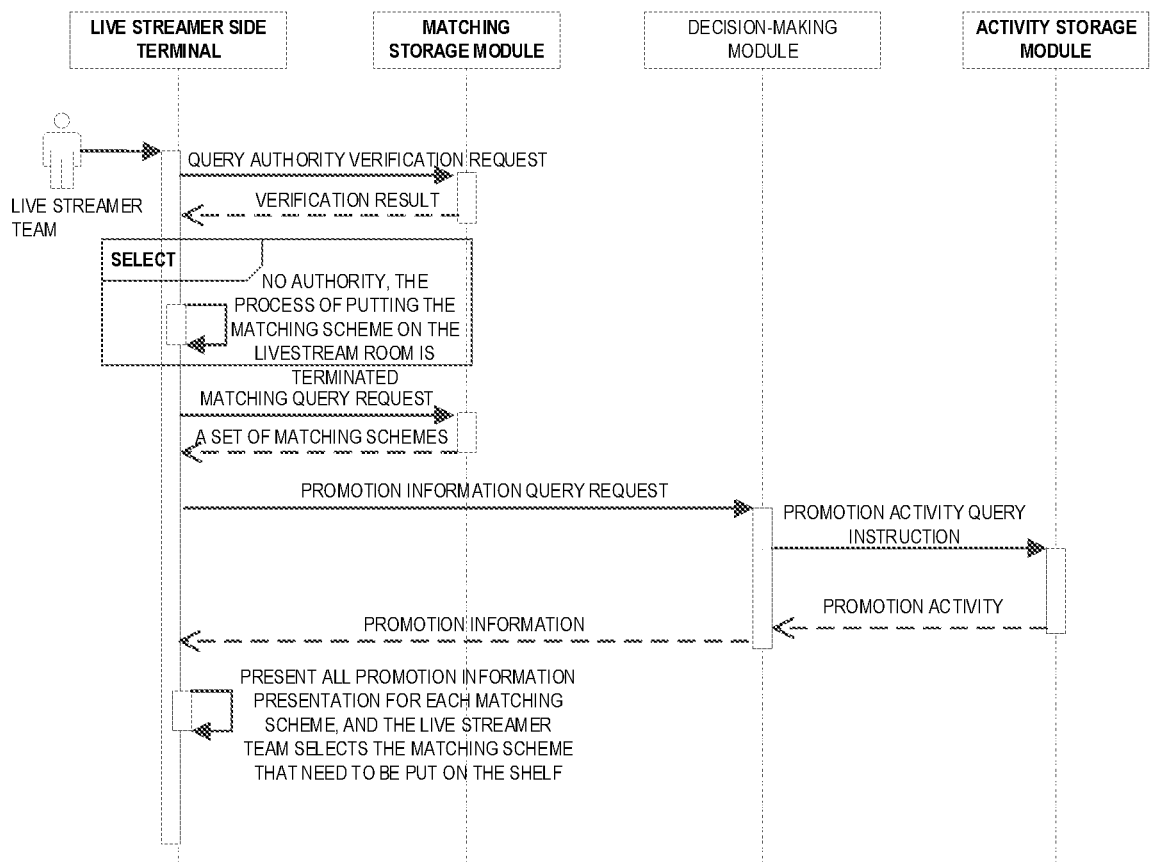
FIG. 11 is a schematic flow chart of presenting attribute information of the matching scheme to a livestreaming team provided by the embodiments of the disclosure.

FIG. 11 is a schematic flow chart of presenting attribute information of the matching scheme to a livestreaming team provided by the embodiments of the disclosure. The process of putting the matching scheme on the shelf of the livestream room requires a cooperation of the live streamer side terminal, the matching storage module, the decision-making module and the activity storage module. Specifically, referring to FIG. 11, the live streamer team generates a matching query request by operating the live streamer side terminal. The live streamer side terminal generates a query authority verification request based on the matching query request, and transmits the query authority verification request to the matching storage module. The query authority verification request is used to indicate the matching storage module to verify the query authority of the live streamer team, and determine whether it has the authority to query the matching scheme. After verifying the query authority of the live streamer team, the matching storage module returns a verification result to the live streamer side terminal. If the verification result is no authority, the process of putting the matching scheme on the shelf of the livestream room is terminated. If the verification result is having the authority, the live streamer side terminal transmits the matching query request to the matching storage module. The matching storage module obtains a set of matching schemes through the query. The set of matching schemes comprises all the matching schemes that the live streamer team has the right to view. All objects of any of the set of matching schemes are matching schemes for which the live streamer team has an agency authority. The matching storage module returns the attribute information of each matching scheme in the set of matching schemes and the attribute information of the commodities constituting the matching scheme to the live streamer side terminal.

In practice, if the attribute information of the commodities constituting the matching scheme returned by the matching storage module to the live streamer side terminal only comprises the identification information of the commodities, the live streamer side terminal transmits a commodity query request to the matching storage module to further acquire other attribute information of the commodities constituting the matching scheme than the identification information. If the attribute information of the commodities constituting the matching scheme returned by the matching storage module to the live streamer side terminal comprises other attribute information than the identification information of the commodities, the live streamer side terminal does not need to transmit the commodity query request to the matching storage module.

Continuing to refer to FIG. 11, the live streamer side terminal transmits a promotion information query request to the decision-making module. The decision-making module generates a promotion activity query instruction based on the promotion information query request, and transmits the promotion activity query instruction to the activity storage module. The activity storage module organizes all the promotion activities corresponding to each queried matching scheme to form a promotion activity query result, and returns the promotion activity query result to the decision-making module. Optionally, the promotion activity query result comprises at least one of the following: all promotion activities corresponding to the matching scheme, the price of each commodity in the matching scheme under each of its corresponding promotion activities, and a state of whether each commodity in the matching scheme is available for purchase. The decision-making module calculates the final price of the matching scheme under each promotion activity based on the activity query result, and the discount details (the discount details refer to the information used to describe how to get the final price on the basis of the original price of the commodity), and presents the final price under each promotion activity and/or the discount details as the promotion information on display interface of the live streamer side terminal. That is, all attribute information of each matching scheme is displayed on the live streamer side terminal. All attribute information of the matching scheme comprises the attribute information of the commodities constituting the matching scheme, the attribute information of the matching scheme as a whole, and the promotion information of the matching scheme.

The live streamer team may view all attribute information of each matching scheme through the live streamer side terminal, and select one or several of them as the matching schemes to be put on the shelf. The live streamer team may select the matching schemes that need to be put on the shelf by operating the live streamer side terminal, so that the selected matching schemes (that is, the matching schemes that need to be put on the shelf) are determined as the matching schemes to be explained, that is, the matching schemes are put on the shelf of the livestream room of the live streamer team.

In the process of putting the matching schemes on the shelf of the livestream room, if the state of any of the set of matching schemes changes from the valid state to the invalid state, the process of putting the matching schemes on the shelf of the livestream room is re-executed, that is, the steps comprised in FIG. 11 are re-executed.

Figure 12:
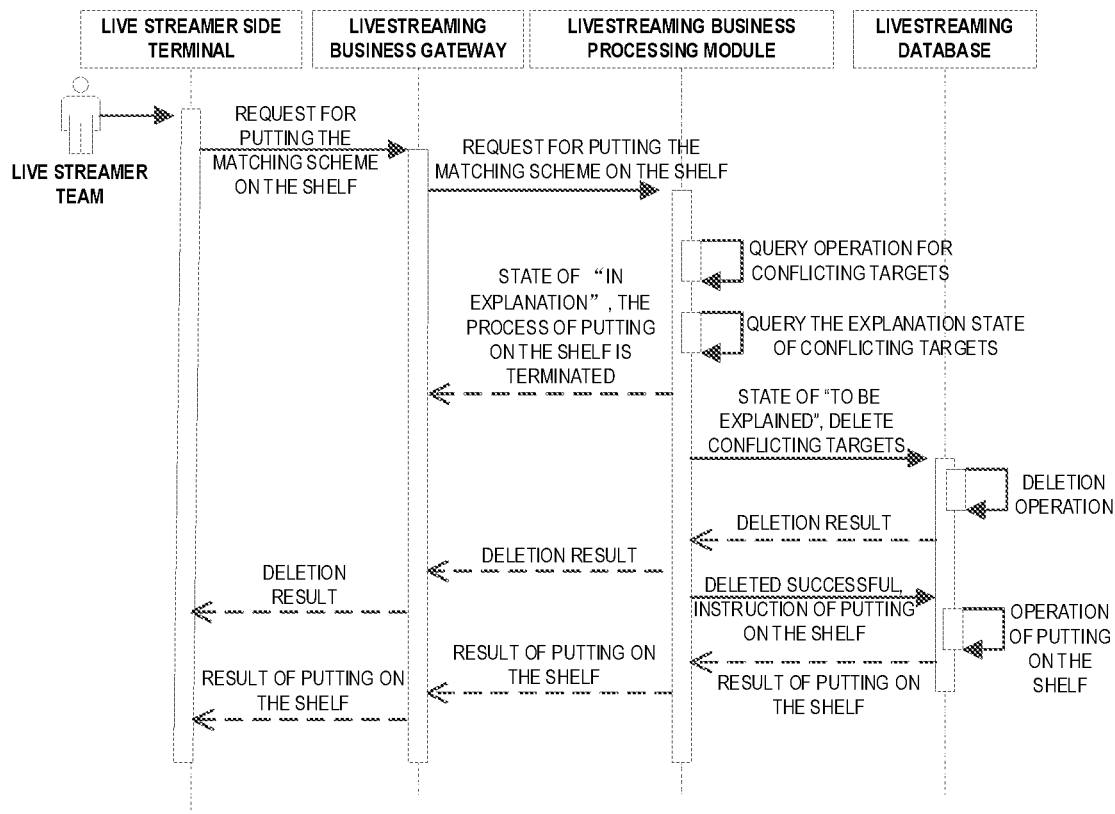
FIG. 12 is a flow chart of determining a matching scheme that needs to be put on the shelf as the matching scheme to be explained provided by the embodiments of the disclosure.

FIG. 12 is a flow chart of determining the matching scheme that needs to be put on the shelf as the matching scheme to be explained provided by the embodiments of the disclosure. The method of determining the matching scheme that needs to be put on the shelf as the matching scheme to be explained needs to be implemented by the livestreaming business gateway, the livestreaming business processing module and the livestreaming database in the livestreaming middle office. The livestreaming database may be regarded as the set to be explained corresponding to the target information streaming page of the livestream room. If a certain matching scheme is put on the shelf, the matching scheme is stored as the matching scheme to be explained in the set to be explained corresponding to the target information streaming page.

Specifically, the live streamer team may operate the live streamer side terminal to select the matching scheme that needs to be put on shelf, generate a request for putting the matching scheme on the shelf, and transmit it to the livestreaming business gateway. The request for putting the matching scheme on the shelf comprises the attribute information of the matching scheme as a whole that is selected by the live streamer team and the attribute information of the commodities comprised in the selected matching scheme. After receiving the request for putting the matching scheme on the shelf, the livestreaming business gateway transmits the request for putting the matching scheme on the shelf to the livestreaming business processing module. The livestreaming business processing module performs a query operation for conflicting targets (comprising conflicting objects and/or conflicting matching schemes). The query operation for conflicting targets is used to query whether there are currently conflicting targets that conflict with the matching scheme that needs to be put on the shelf. If there is currently a conflicting target, it further queries an explanation state of the conflicting target.

If the conflicting target is a conflicting object, the presentation priority of the conflicting target satisfies the preset presentation condition. By way of example, the conflicting target is set as the mainly recommended object. If the conflicting target is a conflicting matching scheme, the conflicting target and the selected matching scheme comprise at least one same object.

If the explanation state of the conflicting target is the state of "in explanation", the operation of putting the matching scheme that needs to be put on the shelf is terminated. The state of "in explanation" refers to the state in which the live streamer is explaining the conflicting target.

If the explanation state of the conflicting target is the state of "to be explained", the livestreaming business processing module generates an instruction of deleting the conflicting target, and transmits the instruction to the livestreaming database. The livestreaming database performs the operation for deleting the conflicting target, and returns a deletion result to the livestreaming business processing module. The livestreaming business processing module returns the deletion result to the livestreaming business gateway. The state of "to be explained" refers to the state in which the live streamer has not explained the conflicting target.

If the deletion result is deletion failed, the operation for putting the matching scheme (which needs to be on the shelf) on the shelf is terminated. If the deletion result is deletion success, the livestreaming business processing module generates an instruction for putting on the shelf, and transmits the instruction for putting on the shelf to the livestreaming database. The livestreaming database executes an operation that determines the matching schemes that needs to put on the shelf as the matching scheme to be explained. The livestreaming database also generates a result of putting on the shelf and returns it to the livestreaming business processing module. The livestreaming business processing module returns the result of putting on the shelf to the livestreaming business gateway. The livestreaming business gateway returns the result of putting on the shelf to the live streamer side terminal.

Subsequently, the livestream viewer side terminal transmits a presentation request for the matching scheme to be explained to the server. In response to the presentation request, the server transmits the attribute information of the matching scheme to be explained to the livestream viewer side terminal. The livestream viewer side terminal renders the target information streaming page based on the attribute information of the matching scheme to be explained, acquires the target information streaming page comprising at least a part of the attribute information of the matching scheme to be explained, and presents the target information streaming page.

Figure 13:
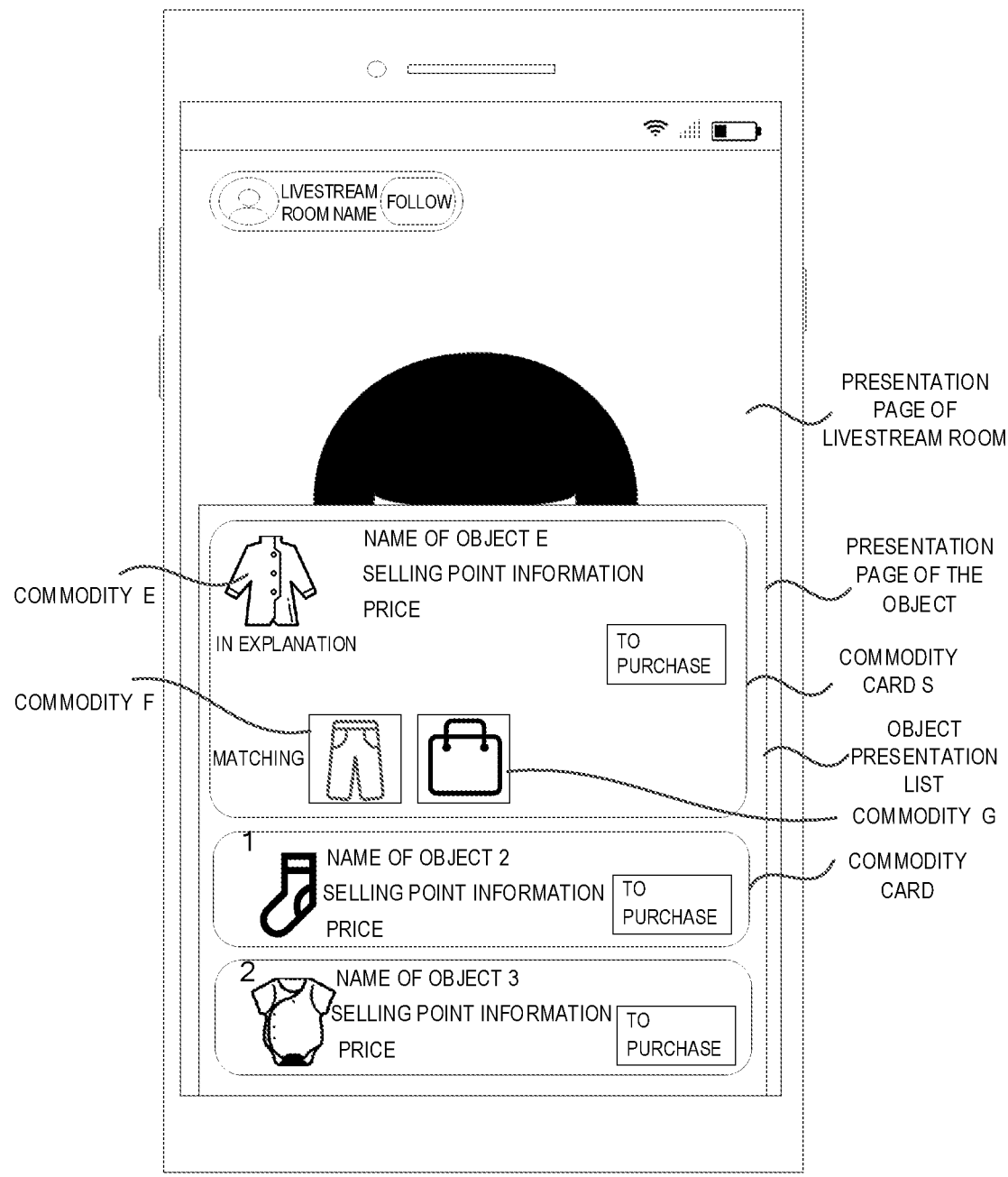
FIG. 13 is a schematic diagram of an information streaming page of a livestream room provided by the embodiments of the present disclosure.

FIG. 13 is a schematic diagram of the information streaming page of the livestream room provided by the embodiments of the present disclosure. Referring to FIG. 13, the information streaming page of the livestream room is the presentation page of the livestream room. The presentation page of the livestream room comprises an object presentation list, which comprises summary information of a plurality of objects. The summary information is used to present a part of the attribute information of the objects to which it belongs. By way of example, the summary information is the commodity card. In FIG. 13, commodity card S is the summary information corresponding to the matching scheme.

In one embodiment, if a certain matching scheme comprises at least two objects, one of which is the primary object and the other is the secondary object, the summary information of the matching scheme comprises attribute information of the primary object and attribute information of the secondary object. Optionally, in the summary information of the matching scheme, the information amount of the attribute information of the primary object is greater than that of the attribute information of any secondary object. For example, continuing to refer to FIG. 13, a certain matching scheme comprises commodity E, commodity F and commodity G, and commodity E is set as the primary object of the matching scheme, while commodity F and commodity G as secondary objects. The commodity card S of the matching scheme comprises the name, selling point information, image information and price of commodity E. The commodity card S of the matching scheme also comprises image information of commodity F and image information of commodity G.

Figure 14:
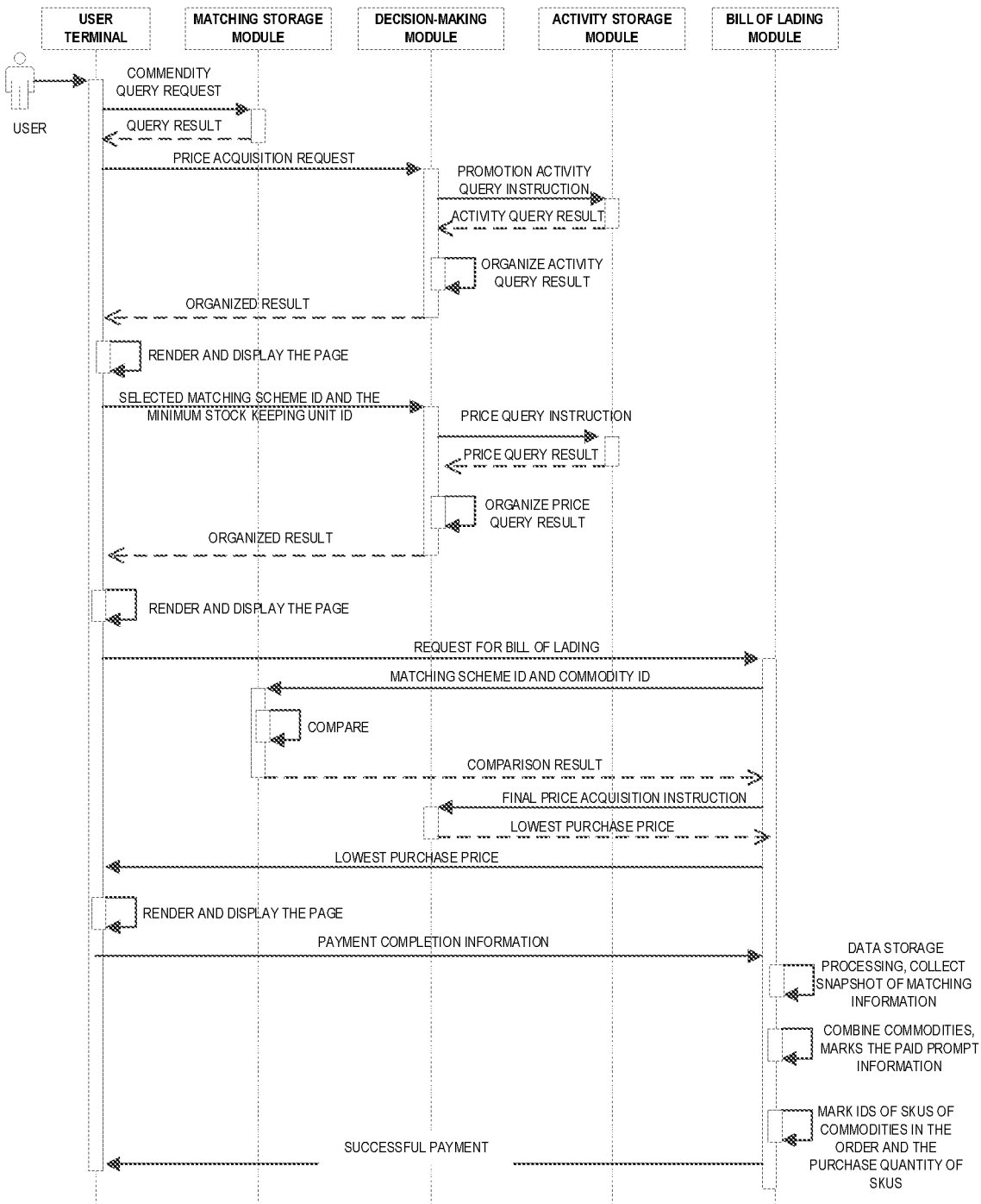
FIG. 14 is a flow chart of a method for purchasing an object in a matching scheme provided by the embodiments of the present disclosure.

FIG. 14 is a flow chart of a method for purchasing the object in the matching scheme provided by the embodiments of the present disclosure. Referring to FIG. 14, the method for purchasing the object in the matching scheme is implemented by the livestream viewer side terminal and the server. The server is mainly completed by the matching storage module, the decision-making module, the activity storage module, and the bill of lading module.

Figure 15:
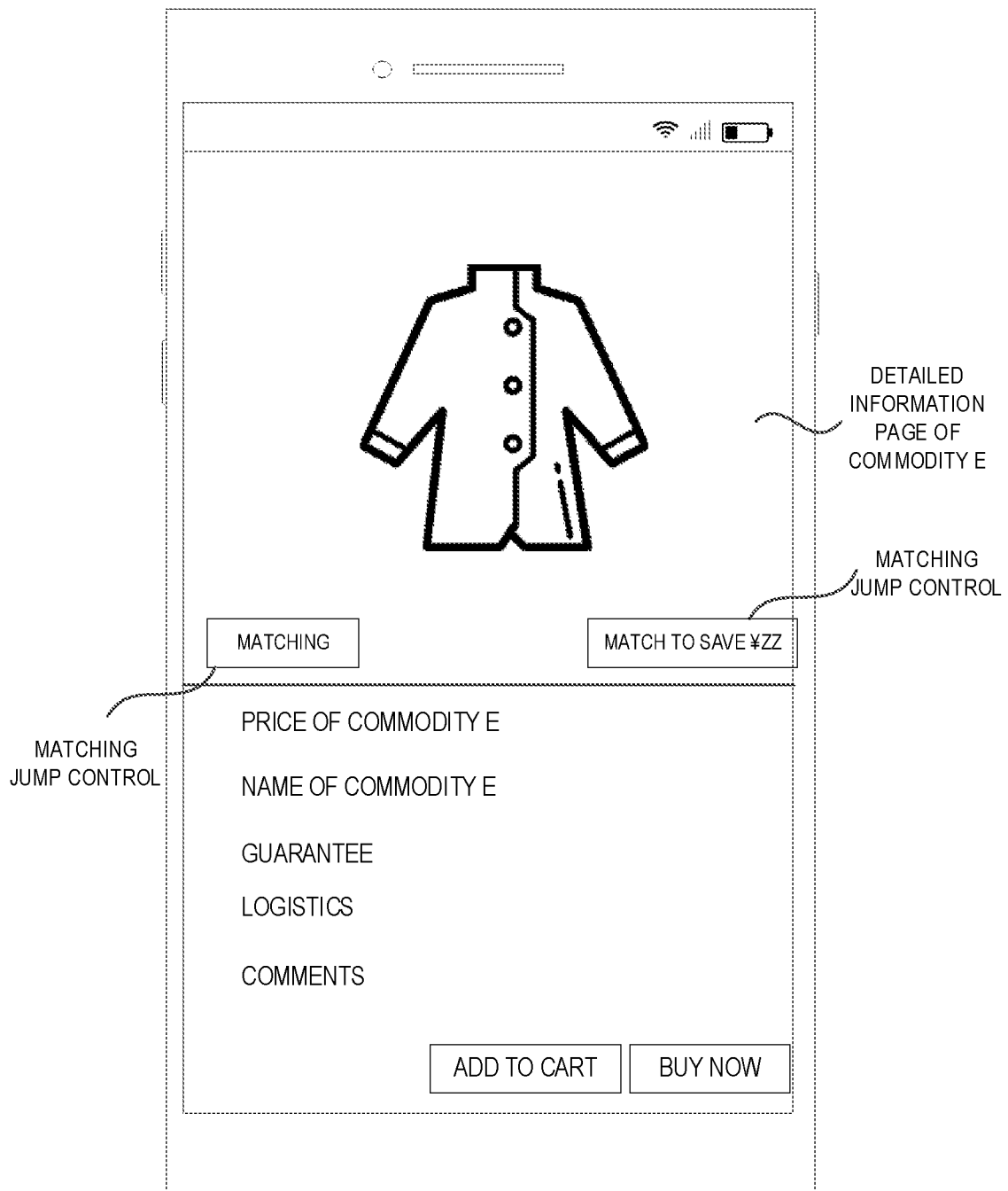
FIG. 15 is a schematic diagram of a display interface of a livestream viewer side terminal provided by the embodiments of the present disclosure.

Specifically, FIG. 15 is a schematic diagram of the display interface of the livestream viewer side terminal provided by the embodiments of the present disclosure. Referring to FIG. 13, in a case where the user wants to purchase a commodity in the matching scheme, the user clicks the control of "purchase" in the commodity card S of the matching scheme. As shown in FIG. 15, the livestream viewer side terminal displays the detailed information page of the primary commodity (i.e., commodity E) in the matching scheme. The detailed information page of the primary commodity comprises a matching jump control. When the user clicks the matching jump control, the livestream viewer side terminal generates a commodity query request, which comprises the matching scheme ID.

As shown in FIG. 12, the livestream viewer side terminal transmits the commodity query request to the matching storage module. The matching storage module queries the commodities comprised in the matching scheme based on the matching scheme ID, and returns a query result to the livestream viewer side terminal. The livestream viewer side terminal further generates a price acquisition request, and the livestream viewer side terminal transmits the price acquisition request to the decision-making module. The decision-making module generates a promotion activity query instruction based on the price acquisition request, and transmits the promotion activity query instruction to the activity storage module. The activity storage module queries information of all promotion activities corresponding to the matching scheme, obtains an activity query result, and returns the activity query result to the decision-making module. The decision-making module organizes all the activity query results corresponding to the matching scheme to obtain an organized result. Optionally, the organized result comprises at least one of the following: all marketing activities corresponding to the matching scheme, the price of each commodity in the matching scheme under each of its corresponding promotion activities, and a state of whether each commodity in the matching scheme is available for purchase. The decision-making module returns the organized result to the livestream viewer side terminal. The livestream viewer side terminal renders the page based on the organized result to obtain and present the detailed information page of a matching scheme.

Figure 16:
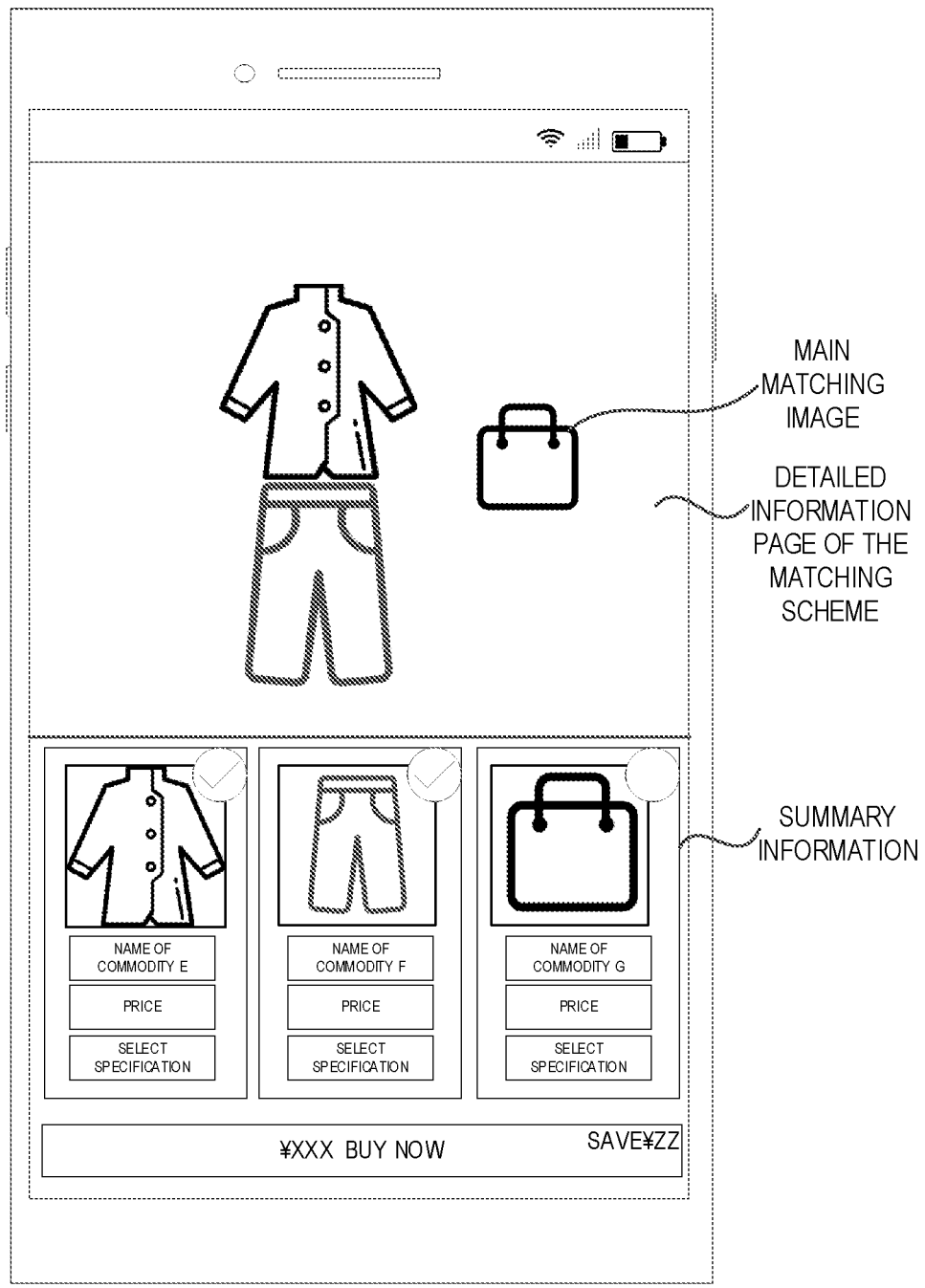
FIG. 16 is a schematic diagram of a detailed information page of a matching scheme provided by the embodiments of the present disclosure.

FIG. 16 is a schematic diagram of the detailed information page of the matching scheme provided by the embodiments of the present disclosure. Referring to FIG. 16, the detailed information page of the matching scheme comprises the main matching image of the matching scheme and the summary information of each commodity (comprising the primary commodity and secondary commodities) in the matching scheme. The summary information of the commodity comprises at least a part of the attribute information of the commodity, such as the name and price of the commodity. Optionally, the summary information of the commodity also comprises a specification selection control. If the user selects the summary information of a certain commodity, it indicates that the user wishes to purchase the commodity. The user needs to further operate the specification selection control to select the specification attribute of the commodity to help the server locate the minimum stock keeping unit that the user needs to purchase.

Continuing to refer to FIG. 16, if the user wishes to purchase commodity E and commodity F, the user clicks on the option box in the upper right corner of the summary information of commodity E to change it from an unselected state to a selected state. In this embodiment, in the unselected state, the interior of the circular option box is blank; in the selected state, the interior of the circular option box has a check mark. Next, the user needs to select the specification attributes of commodity E and commodity F. When the user needs to select the specification attribute of commodity E, the user clicks the specification selection control in the summary information of commodity E, and the specification attribute selection page of commodity E is further presented on the detailed information page of the matching scheme.

Figure 17:
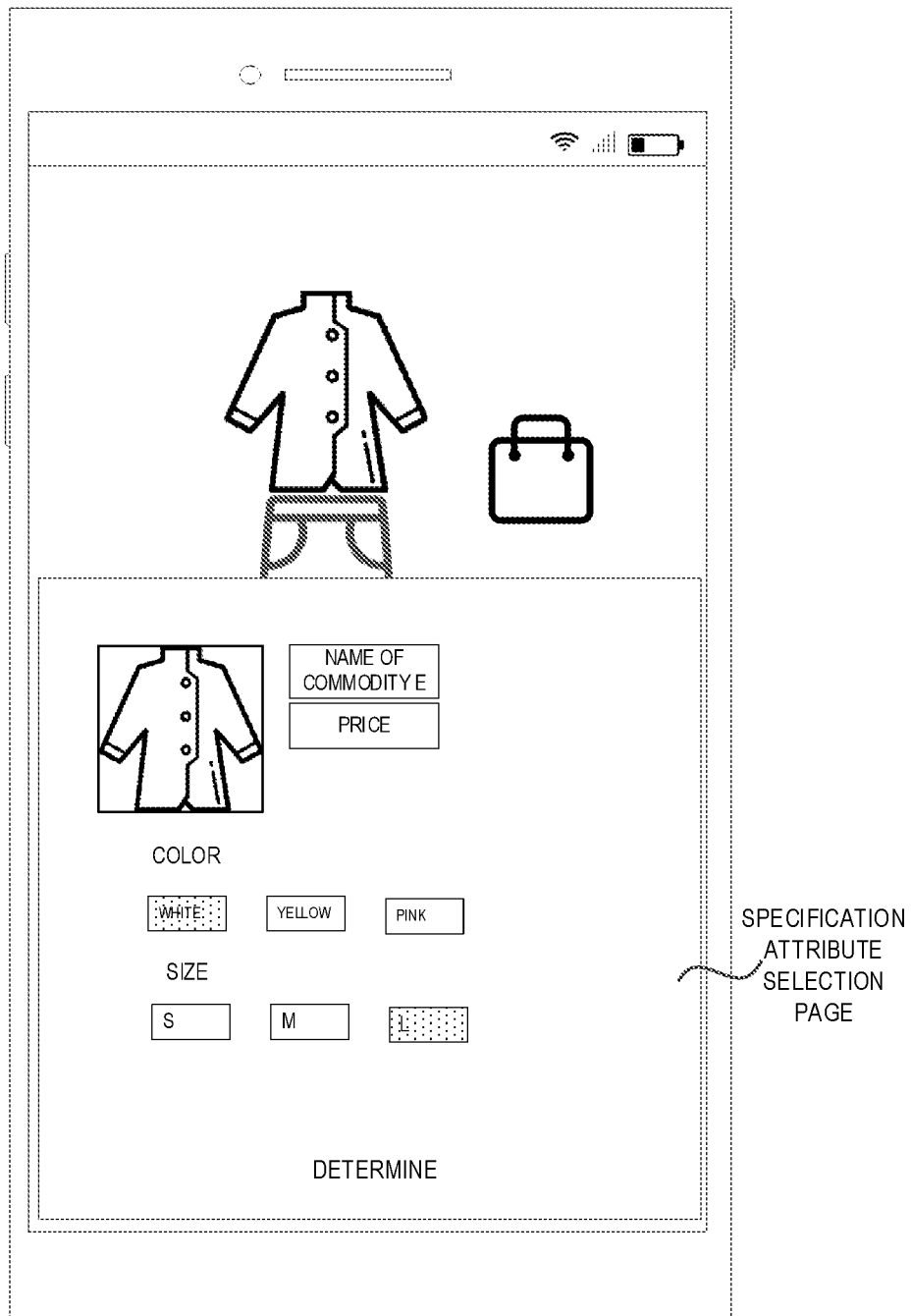
FIGS. 17-18 are schematic diagrams of detailed information pages of two other matching schemes provided by the embodiments of the disclosure.
Figure 18:
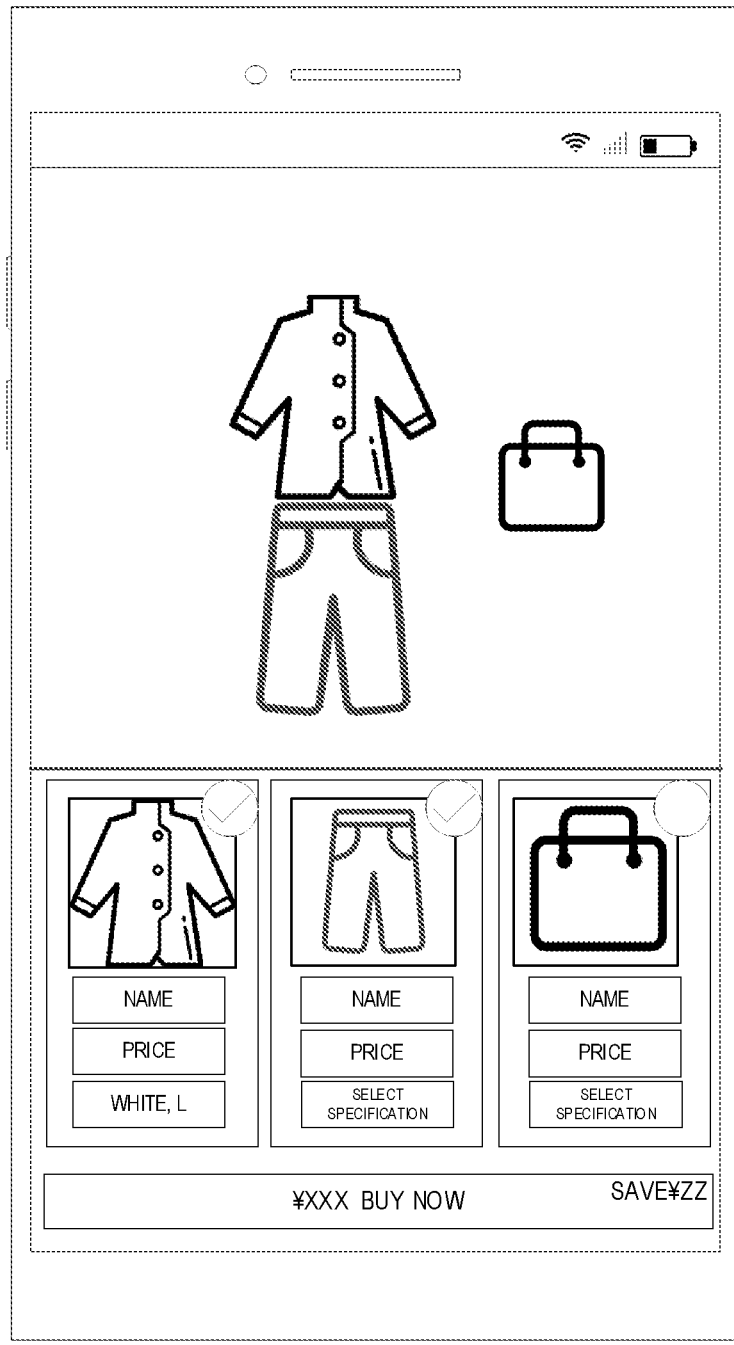

FIGS. 17-18 are schematic diagrams of detailed information pages of two other matching schemes provided by the embodiments of the disclosure. Referring to FIG. 17, the specification attribute selection page of commodity E comprises a part of the attribute information of commodity E, such as, the name and price of commodity E, and all the specification attribute information of commodity E. The user may select the specification attributes of commodity E. After selecting the specification attribute of commodity E, the user clicks the control of "OK". The display interface of the livestream viewer side terminal is shown in FIG. 18, where the specification attributes selected by the user in FIG. 17 are "white" and "L". The specification selection control in FIG. 18 presents the specification attribute information selected by the user.

Continuing to refer to FIG. 18, as the summary information of commodity E and the summary information of commodity F are in the selected state, while the specification attribute of commodity F is not selected, at this point, if the user clicks on the control of "Buy Now", the border of the summary information of commodity F will flicker or shake, or the color of the border of the summary information of commodity F will change, so as to prompt the user to select the specification attribute of commodity F.

Continuing to refer to FIG. 14, when the user selects the commodities to be purchased and the specification attributes of the commodities to be purchased, the livestream viewer side terminal transmits the matching scheme ID selected by the user and the minimum stock keeping unit IDs of the commodities in the matching scheme selected by the user to the decision-making module. The decision-making module generates a price query instruction based on the minimum stock keeping unit IDs and transmits the price query instruction to the activity storage module for querying a price of individually purchasing each minimum stock keeping unit selected by the user without considering the price of the promotion activity, a price of individually purchasing each minimum stock keeping unit selected by the user and taking the price of the promotion activity into consideration, a price of purchasing several minimum stock keeping unit selected by the user in combination without considering the price of the promotion activity, and a price of purchasing the several minimum stock keeping unit selected by the user in combination and taking the price of the promotion activity into consideration.

The activity storage module returns a price query result to the decision-making purchase module. The decision-making module organizes the price query result and obtains an organized result. The organized result comprises a purchasable state of the minimum stock keeping unit selected by the user, and the lowest purchase price of the minimum stock keeping unit selected by the user. The decision-making module returns the organized result to the livestream viewer side terminal. The livestream viewer side terminal renders the page based on the organized result and displays the rendered page.

After the user selects the commodities to be purchased and the specification attributes of the commodities to be purchased, the lowest purchase price of the commodities selected by the user is presented on the detailed information page of the matching scheme. The lowest purchase price is the minimum value of the final price of the individual purchase method and the final price of the combined purchase method.

For example, referring to FIG. 18, the detailed information page of the matching scheme comprises a control of "Buy Now", which presents the lowest purchase price of the commodities that the user needs to purchase. Furthermore, continuing to refer to FIG. 18, the control of "Buy Now" also presents the discount amount compared to the original price in case of purchasing at the lowest purchase price.

After the user clicks the control of "Buy Now", the livestream viewer side terminal generates a bill of lading request, and the livestream viewer side terminal transmits the bill of lading request to the bill of lading module. The bill of lading request comprises the attribute information of the commodities that the user wishes to purchase. Here, the attribute information of the commodities comprises the matching scheme ID, the commodity IDs, and other attribute information of the commodities. The bill of lading module transmits the attribute information of the commodities in the bill of lading request to the matching storage module. The matching storage module queries other attribute information of the commodities that the user wishes to buy based on the matching scheme ID and the commodity IDs, and compares a query result with other attribute information of the commodities received from the bill of lading module. If the comparison result is consistent, it indicates that the commodities that the user currently wishes to purchase are correct. The matching scheme ID and the commodity IDs are recorded, and the matching storage module returns the comparison result to the bill of lading module.

The bill of lading module generates a final price acquisition instruction and transmits the final price acquisition instruction to the decision-making module. The decision-making module returns the lowest purchase price of the commodities that the user wishes to purchase to the bill of lading module. The bill of lading module returns the lowest purchase price of the commodities that the user wishes to purchase to the livestream viewer side terminal. The livestream viewer side terminal renders the page to obtain an order confirmation page, and displays the order confirmation page. When the user clicks a payment control on the order confirmation page, the livestream viewer side terminal generate payment completion information, and transmits the payment completion information to the bill of lading module. The bill of lading module performs data storage processing, collects the snapshots of matching information in the order, combines the commodities in the order, marks the paid prompt information, marks the IDs of the minimum stock keeping units of the commodities in the order and the purchase quantity of the minimum stock keeping units, then returns the prompt information of successful payment to the livestream viewer side terminal.

It should be noted that in order to simplify the description, each of the aforementioned method embodiments is described as a combination of a series of actions. However, those skilled in the art should be aware that the present invention is not limited by the described sequence of the actions, as according to the present invention, some steps may be performed in other sequences or simultaneously. Secondly, those skilled in the art should also be aware that the embodiments described in the specification are all preferred embodiments, and the actions and modules involved may not be necessary for the present invention.

Figure 19:
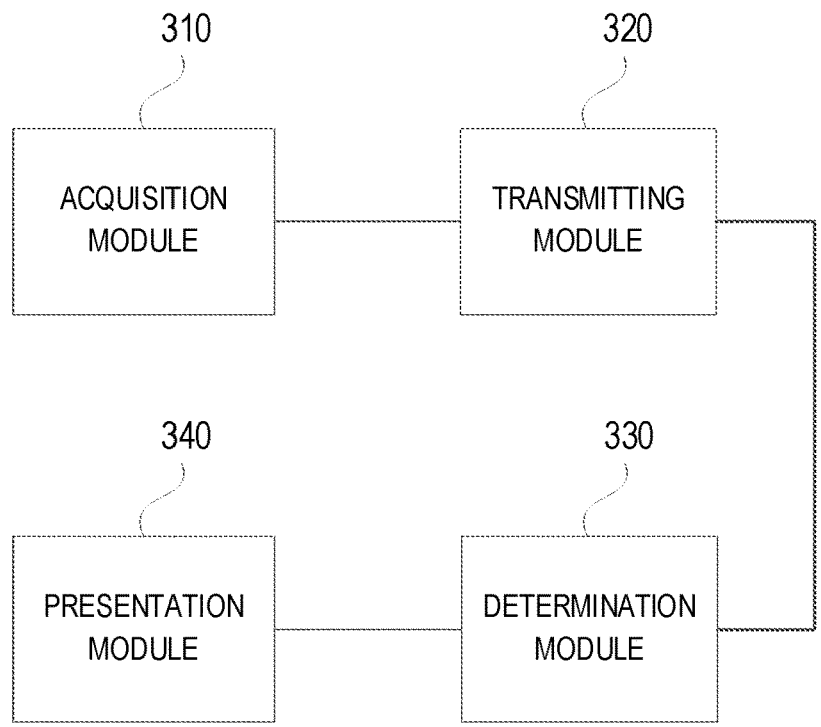
FIG. 19 is a schematic structural diagram of an apparatus for presentation of a matching scheme in the embodiments of the present disclosure.

FIG. 19 is a schematic structural diagram of an apparatus for presentation of a matching scheme in the embodiments of the present disclosure. The apparatus for presentation of the matching scheme provided by the embodiments of the present disclosure may be configured in the server. Referring to FIG. 19, the apparatus for presentation of the matching scheme specifically comprises:

an acquisition module 310 for acquiring a set of matching schemes; the set of matching schemes comprising at least one matching scheme, the matching scheme comprising at least two objects, the at least two objects having a matching relation;

a transmitting module 320 for transmitting, to a first terminal, attribute information of the matching schemes in the set of matching schemes, so that the first terminal displays the attribute information of the matching schemes comprised in the set of matching schemes;

a determination module 330 for in response to a selection request for one of the matching schemes transmitted by the first terminal, determining the selected matching scheme as a matching scheme to be explained;

a presentation module 340 for in response to a presentation request for the matching scheme to be explained that is transmitted by a second terminal, transmitting the attribute information of the matching scheme to be explained to the second terminal, so that the second terminal presents a target information streaming page comprising at least a part of the attribute information of the matching scheme to be explained.

Additionally, all objects of any of the set of matching schemes are matching schemes for which an account of the first terminal has an agency authority.

Additionally, the apparatus further comprises a matching construction module; the matching construction module is used for:
before acquiring the set of matching schemes, acquiring identification information of at least two objects;
constructing a matching scheme based on the identification information of the at least two objects;
adding the constructed matching scheme to the matching database;
the acquisition module is further used for:
determining a set of matching schemes from the matching database.

Additionally, the matching construction module is further used for after constructing the matching scheme based on the identification information of the at least two objects, in response to a configuration instruction of the matching scheme, configuring promotion information of the matching scheme.

Additionally, the attribute information of the matching scheme comprises one or more of the following:
attribute information of objects constituting the matching scheme, the attribute information of the matching scheme as a whole, and the promotion information of the matching scheme.

Additionally, a state of the matching scheme comprises a valid state and an invalid state; the apparatus further comprises an update module, the update module is used for:
if one of the matching schemes satisfies a preset invalidation condition, setting the state of the matching scheme in the matching database from the valid state to the invalid state;
updating the set of matching schemes, so that all the matching schemes in the updated set of matching schemes are in a valid state;
wherein the preset invalidation condition comprises that all objects in the matching scheme are in a preset state, and/or a lifetime of the matching scheme reaches a preset lifetime.

Additionally, the apparatus further comprises a conflict processing module, the conflict processing module is used for:
storing the matching scheme to be explained in a set to be explained corresponding to the target information streaming page;
if the set to be explained comprises a conflict object corresponding to the matching scheme to be explained, deleting the conflict object from the set to be explained;
if the set to be explained comprises a conflict matching scheme corresponding to the matching scheme to be explained, deleting the conflict matching scheme from the set to be explained.

Additionally, the conflict object refers to an object to be explained whose presentation priority satisfies a preset presentation condition;

The conflict match scheme refers to a matching scheme comprising at least one object that is the same as at least one object comprised in the matching scheme to be explained.

Additionally, the transmitting module is used for acquiring an acquisition request for the matching schemes transmitted by the first terminal;
transmitting, to the first terminal, the attribute information of the matching schemes in the set of matching schemes.

Additionally, the target information streaming page is a presentation page of a livestream room or a preview streaming page of a livestream, the object is a commodity corresponding to the livestream room, the first terminal is a streamer side terminal, and the second terminal is a livestream viewer side terminal.

The apparatus for presentation of the matching scheme provided by the embodiments of the present disclosure can execute the steps executed by the server in the method for presentation of the matching scheme provided by the embodiments of the present disclosure, and has the execution steps and beneficial effects, which will not be repeated herein.

Figure 20:
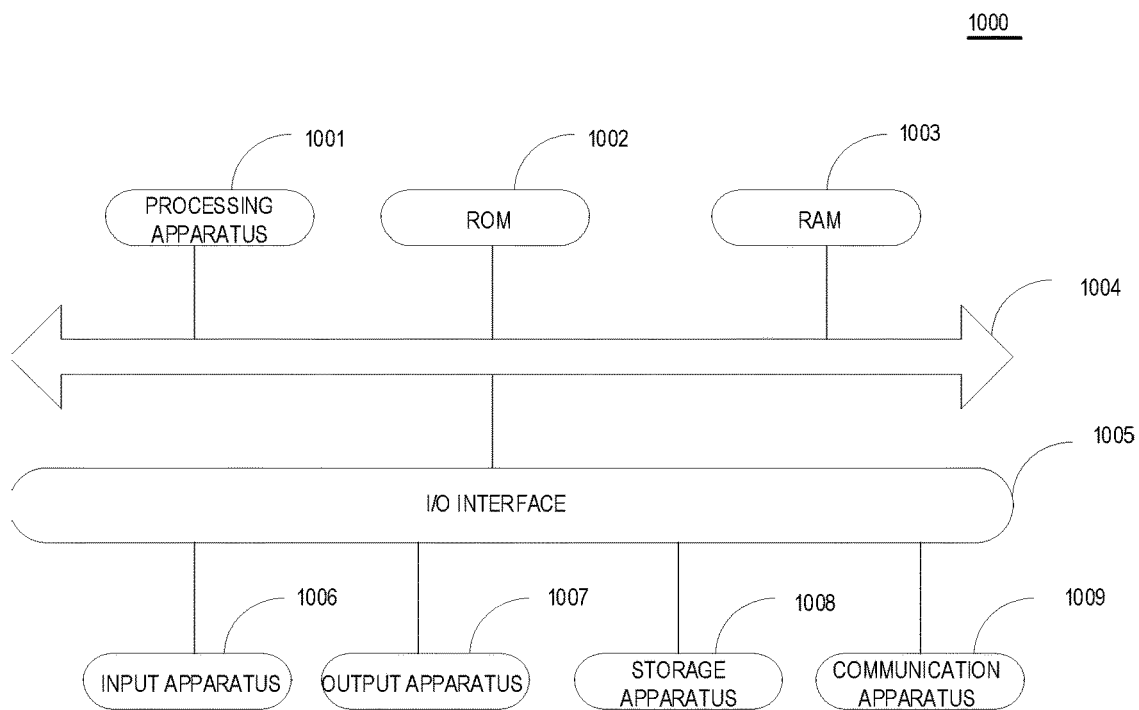
FIG. 20 is a schematic structural diagram of an electronic device in the embodiments of the present disclosure.

FIG. 20 is a schematic structural diagram of an electronic device in the embodiments of the present disclosure. Referring specifically to FIG. 20 in the following, which illustrates a schematic structural diagram suitable for implementing the electronic device 1000 in the embodiments of the present disclosure. The electronic device 1000 in the embodiments of the present disclosure may comprise, but is not limited to, a mobile terminal, such as, a mobile phone, a notebook computer, a digital broadcasting receiver, a personal digital assistant (PDA), a PAD (tablet), a portable multimedia player (PMP), a vehicle-mounted terminal (e.g., in-vehicle navigation terminal), a wearable electronic device, and a fixed terminal, such as, a digital TV, a desktop computer, a smart home appliance, and the like. The electronic device illustrated in FIG. 20 is only an example without any limitations on the functions and scope of use of the embodiments of the present disclosure.

As shown in FIG. 20, the electronic device 1000 may comprise the processing apparatus (e.g., a central processor, a graphics processor, etc.) 1001, which may perform various appropriate actions and process according to the program stored in the read-only memory (ROM) 1002 or the program loaded from the storage apparatus 1008 into the random access memory (RAM) 1003 to carry out the method for presentation of the matching scheme described in the embodiments of the present disclosure. In the RAM 1003, various programs and information required for the operation of the electronic device 1000 are also stored. The processing apparatus 1001, ROM 1002, and RAM 1003 are connected to each other via the bus 1004. The input/output (I/O) interface 1005 is also connected to the bus 1004.

Generally, the following apparatuses may be connected to the I/O interface 1005: the input apparatus 1006 including, for example, touch screen, touchpad, keyboard, mouse, camera, microphone, accelerometer, gyroscope, etc.; the output apparatus 1007 including, for example, liquid crystal display (LCD), speaker, vibrator, etc.; the storage apparatus 1008 including, for example, magnetic tape, hard drive, etc.; and the communication apparatus 1009. The communication apparatus 1009 may allow the electronic device 1000 to communicate wirelessly or wirelessly with other devices to exchange information. Although FIG. 20 illustrates the electronic device 1000 with various apparatuses, it should be understood that it is not required to implement or possess all the illustrated apparatuses. More or fewer apparatuses may be alternatively implemented or possessed.

Specifically, according to the embodiments of the present disclosure, the processes described above with reference to the flow charts may be implemented as a computer software program. For example, the embodiments of the present disclosure comprise a computer program product, which comprises a computer program carried on a non-transitory computer-readable medium. The computer program contains program code for executing the method shown in the flow chart for implementing the method for presentation of the matching scheme as described above. In such an embodiment, the computer program may be downloaded and installed from the network through the communication apparatus 1009, or installed from the storage apparatus 1008, or installed from the ROM 1002. When the computer program is executed by the processing apparatus 1001, the above functions defined in the method of the embodiments of the present disclosure are executed.

It should be noted that the computer-readable medium mentioned above in the present disclosure may be a computer-readable signal medium or a computer-readable storage medium, or any combination thereof. The computer-readable storage medium may be, for example, but not limited to, electrical, magnetic, optical, electromagnetic, infrared, or semiconductor systems, apparatuses or devices, or any combination thereof. More specific examples of computer-readable storage medium may comprise, but are not limited to: electrical connection with one or more wires, portable computer disk, hard drive, random access memory (RAM), read-only memory (ROM), erasable programmable read-only memory (EPROM or flash memory), optical fiber, portable compact disk read-only memory (CD-ROM), optical storage device, magnetic storage device or any suitable combination of the above. In the present disclosure, the computer-readable storage medium may be any tangible medium that contains or stores a program, which may be used by or in combination with an instruction execution system, apparatus, or device. In the present disclosure, the computer-readable signal medium may comprise information signals propagated in baseband or as part of the carrier, which carry computer-readable program code. Such propagated information signals may take a variety of forms, including but not limited to, electromagnetic signals, optical signals, or any suitable combination of the above. The computer-readable signal medium may also be any computer-readable medium other than a computer-readable storage medium, which can transmit, propagate, or transport a program for use by or in combination with an instruction execution system, apparatus, or device. The program code contained on the computer readable medium may be transmitted using any suitable medium, including but not limited to, wire, optical cable, radio frequency (RF), etc., or any suitable combination of the above.

In some implementations, clients and servers may communicate using any known or future developed network protocol, such as, HyperText Transfer Protocol (HTTP), and may interconnect with digital information communication (e.g., communication network) in any form or medium. Examples of communication network comprise local area network (LAN), wide area network (WAN), Internet, and end-to-end network (e.g., ad hoc end-to-end network), as well as any known or future developed network.

The above-mentioned computer readable medium may be contained in the above-mentioned electronic device; alternatively, it may exist separately without being assembled into the electronic device.

The above-mentioned computer readable medium carries one or more programs, the one or more programs, when executed by the electronic device, cause the electronic device to:

acquire a set of matching schemes; the set of matching schemes comprising at least one matching scheme, the matching scheme comprising at least two objects, and the at least two objects having a matching relation;

transmit, to a first terminal, attribute information of the matching schemes in the set of matching schemes, so that the first terminal displays the attribute information of the matching schemes comprised in the set of matching schemes;

in response to a selection request for one of the matching schemes transmitted by the first terminal, determining the selected matching scheme as a matching scheme to be explained;

in response to a presentation request for the matching scheme to be explained that is transmitted by a second terminal, transmitting the attribute information of the matching scheme to be explained to the second terminal, so that the second terminal presents a target information streaming page comprising at least a part of the attribute information of the matching scheme to be explained.

Optionally, when the one or more programs are executed by the electronic device, the electronic device may further perform other steps described in the above embodiments.

Computer program code for executing the operations of the present disclosure may be written in one or more programming languages or a combination thereof, including but not limited to, object-oriented programming languages, such as, Java, Smalltalk, C++, and conventional procedural programming languages, such as, C or similar programming languages. Program code may be completely executed on the user's computer, partially executed on the user's computer, executed as a standalone software package, partially executed on the user's computer and partially executed on a remote computer, or completely executed on a remote computer or server. In the case involving the remote computer, the remote computer may be connected to the user's computer through any kind of network, including the local area network (LAN) or the wide area network (WAN), or may be connected to an external computer (e.g., using an Internet service provider to connect through the Internet).

The flow chart and block diagram in the accompanying drawings illustrate the architectures, functions, and operations of possible implementations of systems, methods, and computer program products according to various embodiments of the present disclosure. In this regard, each block in the flow chart or block diagram may represent a module, a program segment, or a part of code that contains one or more executable instructions for implementing specified logical functions. It should also be noted that, in some alternative implementations, the functions indicated in the blocks may occur in a different order than that indicated in the accompanying drawings. For example, two blocks shown in succession may actually be executed substantially in parallel, and sometimes they may also be executed in reverse order, which depends on the functions involved. It should also be noted that each of the blocks in the block diagram and/or flow chart, as well as the combination of blocks in the block diagram and/or flow chart, may be implemented with a specialized hardware-based system that performs specified functions or operations, or may be implemented with a combination of specialized hardware and computer instructions.

The modules described in the embodiments of the present disclosure may be implemented in software or hardware. In some cases, the modules are not limited by the names of the modules.

The functions described above herein may be executed, at least in part, by one or more hardware logic components. For example, and without limitation, exemplary types of hardware logic components that may be used comprise: Field Programmable Gate Array (FPGA), Application Specific Integrated Circuit (ASIC), Application Specific Standard Product (ASSP), System On Chip (SOC), Complex Programmable Logic Device (CPLD), and so on.

In the context of the present disclosure, a machine readable medium may be a tangible medium that may contain or store a program for use by or in combination with the instruction execution system, apparatus, or device. The machine readable medium may be a machine readable signal medium or a machine readable storage medium. The machine readable medium may comprise, but are not limited to, electronic, magnetic, optical, electromagnetic, infrared, or semiconductor system, apparatus, or device, or any suitable combination of the above. More specific examples of the machine readable storage medium may comprise electrical connection based on one or more wires, portable computer disk, hard drive, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above.

According to one or more embodiments of the present disclosure, there is provided an electronic device, comprising:
one or more processors;
a memory for storing one or more programs;
the one or more programs, when executed by the one or more processors, cause the one or more processors to carry out any of the methods for presentation of the matching scheme as provided by the present disclosure.

According to one or more embodiments of the present disclosure, there is provided a computer-readable storage medium having a computer program stored thereon, wherein the program, when executed by a processor, carries out any of the methods for presentation of the matching scheme as provided by the present disclosure.

The embodiments of the present disclosure also provide a computer program product, which comprises a computer program or instruction. The computer program or instruction, when executed by a processor, causes the method for presentation of the matching scheme described above to be carried out.

It should be noted that herein, relational terms, such as, "first" and "second", are only used to distinguish one entity or operation from another entity or operation, and do not necessarily require or imply there is any such actual relation or order between these entities or operations. Moreover, the terms "comprising", "containing", or any other variant thereof are intended to encompass non exclusive inclusion, such that a process, method, item, or device that comprises a series of elements comprises not only those elements, but also other elements that are not explicitly listed, or elements inherent to the process, method, item, or device. Without further limitations, an element defined by the expression "comprising one . . . " does not exclude the presence of additional identical elements in the process, method, item, or device that comprises the said elements.

The above descriptions are only the specific implementations of the present disclosure, which enable those skilled in the art to understand or implement the present disclosure. Various modifications to these embodiments will be apparent to those skilled in the art, and the general principles defined herein may be implemented in other embodiments without departing from the spirit or scope of the present disclosure. Therefore, the present disclosure is not limited to the embodiments described herein, but rather to the widest scope consistent with the principles and novel features disclosed herein.

What is claimed is:

1. A method for presentation of a matching scheme comprising:
acquiring a set of matching schemes, the set of matching schemes comprising at least one matching scheme, the matching scheme comprising at least two objects, the at least two objects having a matching relation;
transmitting, to a first terminal, attribute information of the matching schemes in the set of matching schemes, so that the first terminal displays the attribute information of the matching schemes comprised in the set of matching schemes;
in response to a selection request for one of the matching schemes transmitted by the first terminal, determining the selected matching scheme as a matching scheme to be explained;
in response to a presentation request for the matching scheme to be explained that is transmitted by a second terminal, transmitting the attribute information of the matching scheme to be explained to the second terminal, so that the second terminal presents a target information streaming page comprising at least a part of the attribute information of the matching scheme to be explained;
storing the matching scheme to be explained in a set to be explained corresponding to the target information streaming page;
if the set to be explained comprises a conflicting object corresponding to the matching scheme to be explained, deleting the conflicting object from the set to be explained;
if the set to be explained comprises a conflict matching scheme corresponding to the matching scheme to be explained, deleting the conflicting matching scheme from the set to be explained.

2. The method according to claim 1, wherein
all objects of any of the set of matching schemes are matching schemes for which an account of the first terminal has an agency authority.

3. The method according to claim 1, wherein before acquiring the set of matching schemes, the method further comprises:
acquiring identification information of at least two objects;
constructing a matching scheme based on the identification information of the at least two objects;
adding the constructed matching scheme to a matching database;
the acquiring the set of matching schemes comprising:

determining a set of matching schemes from the matching database.

4. The method according to claim 3, wherein after constructing the matching scheme based on the identification information of the at least two objects, the method further comprises:
   in response to a configuration instruction of the matching scheme, configuring promotion information of the matching scheme.

5. The method according to claim 4, wherein the attribute information of the matching scheme comprises one or more of the following:
   attribute information of objects constituting the matching scheme, the attribute information of the matching scheme as a whole, and the promotion information of the matching scheme.

6. The method according to claim 3, wherein a state of the matching scheme comprises a valid state and an invalid state; the method further comprises:
   if one of the matching schemes satisfies a preset invalidation condition, setting the state of the matching scheme in the matching database from the valid state to the invalid state;
   updating the set of matching schemes, so that all the matching schemes in the updated set of matching schemes are in a valid state;
   wherein the preset invalidation condition comprises that all objects in the matching scheme are in a preset state, and/or a lifetime of the matching scheme reaches a preset lifetime.

7. The method according to claim 1, wherein
   the conflicting object refers to an object to be explained whose presentation priority satisfies a preset presentation condition;
   the conflicting match scheme refers to a matching scheme comprising at least one object that is the same as at least one object comprised in the matching scheme to be explained.

8. The method according to claim 1, wherein the transmitting attribute information of the matching schemes in the set of matching schemes to the first terminal comprises:
   acquiring an acquisition request for the matching schemes transmitted by the first terminal;
   transmitting, to the first terminal, the attribute information of the matching schemes in the set of matching schemes.

9. The method according to claim 1, wherein the target information streaming page is a presentation page of a livestream room or a preview streaming page of a livestream, the object is a commodity corresponding to the livestream room, the first terminal is a streamer side terminal, and the second terminal is a livestream viewer side terminal.

10. An electronic device, wherein the electronic device comprises:
    one or more processors;
    a storage apparatus for storing one or more programs;
    the one or more programs, when executed by the one or more processors, cause the one or more processors to carry out a method comprising:
       acquiring a set of matching schemes, the set of matching schemes comprising at least one matching scheme, the matching scheme comprising at least two objects, the at least two objects having a matching relation;
       transmitting, to a first terminal, attribute information of the matching schemes in the set of matching schemes, so that the first terminal displays the attribute information of the matching schemes comprised in the set of matching schemes;
       in response to a selection request for one of the matching schemes transmitted by the first terminal, determining the selected matching scheme as a matching scheme to be explained;
       in response to a presentation request for the matching scheme to be explained that is transmitted by a second terminal, transmitting the attribute information of the matching scheme to be explained to the second terminal, so that the second terminal presents a target information streaming page comprising at least a part of the attribute information of the matching scheme to be explained;
       storing the matching scheme to be explained in a set to be explained corresponding to the target information streaming page;
       if the set to be explained comprises a conflicting object corresponding to the matching scheme to be explained, deleting the conflicting object from the set to be explained;
       if the set to be explained comprises a conflict matching scheme corresponding to the matching scheme to be explained, deleting the conflicting matching scheme from the set to be explained.

11. The electronic device according to claim 10, wherein all objects of any of the set of matching schemes are matching schemes for which an account of the first terminal has an agency authority.

12. The electronic device according to claim 10, wherein before acquiring the set of matching schemes, the method further comprises:
    acquiring identification information of at least two objects;
    constructing a matching scheme based on the identification information of the at least two objects;
    adding the constructed matching scheme to a matching database;
    the acquiring the set of matching schemes comprising:
    determining a set of matching schemes from the matching database.

13. The electronic device according to claim 12, wherein after constructing the matching scheme based on the identification information of the at least two objects, the method further comprises:
    in response to a configuration instruction of the matching scheme, configuring promotion information of the matching scheme.

14. The electronic device according to claim 13, wherein the attribute information of the matching scheme comprises one or more of the following:
    attribute information of objects constituting the matching scheme, the attribute information of the matching scheme as a whole, and the promotion information of the matching scheme.

15. The electronic device according to claim 12, wherein a state of the matching scheme comprises a valid state and an invalid state; the method further comprises:
    if one of the matching schemes satisfies a preset invalidation condition, setting the state of the matching scheme in the matching database from the valid state to the invalid state;
    updating the set of matching schemes, so that all the matching schemes in the updated set of matching schemes are in a valid state;

wherein the preset invalidation condition comprises that all objects in the matching scheme are in a preset state, and/or a lifetime of the matching scheme reaches a preset lifetime.

16. The electronic device according to claim 10, wherein the conflicting object refers to an object to be explained whose presentation priority satisfies a preset presentation condition;

the conflicting match scheme refers to a matching scheme comprising at least one object that is the same as at least one object comprised in the matching scheme to be explained.

17. The electronic device according to claim 10, wherein the transmitting attribute information of the matching schemes in the set of matching schemes to the first terminal comprises:

acquiring an acquisition request for the matching schemes transmitted by the first terminal;

transmitting, to the first terminal, the attribute information of the matching schemes in the set of matching schemes.

18. A non-transitory computer-readable storage medium having a computer program stored thereon, wherein the program, when executed by a processor, carries out a method comprising:

acquiring a set of matching schemes, the set of matching schemes comprising at least one matching scheme, the matching scheme comprising at least two objects, the at least two objects having a matching relation;

transmitting, to a first terminal, attribute information of the matching schemes in the set of matching schemes, so that the first terminal displays the attribute information of the matching schemes comprised in the set of matching schemes;

in response to a selection request for one of the matching schemes transmitted by the first terminal, determining the selected matching scheme as a matching scheme to be explained;

in response to a presentation request for the matching scheme to be explained that is transmitted by a second terminal, transmitting the attribute information of the matching scheme to be explained to the second terminal, so that the second terminal presents a target information streaming page comprising at least a part of the attribute information of the matching scheme to be explained;

storing the matching scheme to be explained in a set to be explained corresponding to the target information streaming page;

if the set to be explained comprises a conflicting object corresponding to the matching scheme to be explained, deleting the conflicting object from the set to be explained;

if the set to be explained comprises a conflict matching scheme corresponding to the matching scheme to be explained, deleting the conflicting matching scheme from the set to be explained.

* * * * *